United States Patent [19]
Yanagihara et al.

[11] Patent Number: 5,558,689
[45] Date of Patent: Sep. 24, 1996

[54] REINFORCED FILTER ELEMENT

[75] Inventors: Hiroyuki Yanagihara; Seihou Taniguchi; Takeshi Hazeyama; Hitoshi Otaka; Teiji Hashimoto; Sansan Souma, all of Tokyo, Japan

[73] Assignee: Nittetsu Mining Co., Ltd., Tokyo, Japan

[21] Appl. No.: 404,458

[22] Filed: Mar. 15, 1995

[30] Foreign Application Priority Data

Jul. 12, 1994 [JP] Japan .................................. 6-181917
Jul. 22, 1994 [JP] Japan .................................. 6-191225

[51] Int. Cl.⁶ .................................................. B01D 46/00
[52] U.S. Cl. .......................... 55/492; 55/499; 55/500; 55/501; 55/521
[58] Field of Search ............... 55/381, 382, 492, 55/497, 499, 500, 501, 521, 378, 379; 210/487, 493.3, 493.5

[56] References Cited

U.S. PATENT DOCUMENTS

| | | | |
|---|---|---|---|
| 2,019,186 | 10/1935 | Kaiser | 55/521 |
| 2,906,371 | 9/1959 | Jones | 55/379 |
| 3,112,184 | 11/1963 | Hollenbach | 55/521 |
| 3,143,503 | 8/1964 | Schmidt et al. | 55/492 |
| 3,386,227 | 6/1968 | Czerwonka | 55/521 |
| 3,410,062 | 11/1968 | Hart | 55/521 |
| 4,102,792 | 7/1978 | Harris | 55/521 |
| 4,135,900 | 1/1979 | Westlin et al. | 55/499 |
| 4,452,619 | 6/1984 | Wright et al. | 55/521 |
| 5,066,319 | 11/1991 | Lippold | 55/521 |
| 5,230,455 | 7/1993 | Price | 55/521 |
| 5,246,474 | 9/1993 | Greatorex | 55/382 |
| 5,271,889 | 12/1993 | Weinrotter et al. | 264/103 |

FOREIGN PATENT DOCUMENTS

| | | |
|---|---|---|
| A10250801 | 1/1988 | European Pat. Off. . |
| A10515045 | 11/1992 | European Pat. Off. . |
| A20542396 | 5/1993 | European Pat. Off. . |
| A10549105 | 6/1993 | European Pat. Off. . |
| 2948249 | 10/1980 | Germany ..... 55/521 |
| A14021607 | 1/1992 | Germany . |
| 56-10312 | 2/1981 | Japan ..... 55/521 |
| 62-225222 | 10/1987 | Japan . |
| 5-277321 | 10/1993 | Japan . |
| 2058601 | 4/1981 | United Kingdom ..... 55/521 |

OTHER PUBLICATIONS

JP-A-6 257 145, Sep. 1994, *Abstract.
JP-A-6327 919, Nov. 29, 1994, *Abstract.
JP-A-7 000 730, Jan. 6, 1995, *Abstract.

*Primary Examiner*—C. Scott Bushey
*Attorney, Agent, or Firm*—Sughrue, Mion, Zinn, Macpeak & Seas

[57] ABSTRACT

A filter element, including a pair of filter plates that are each made of a nonwoven fabric or felt of a polymeric material shaped into a plate having a corrugated cross section and which are positioned in such a way that the grooves in one filter plate are opposed to those in the other filter plate, is reinforced with reinforcements that are placed across the width of the filter element. The reinforcements and the filter element are secured at their respective ends by means of bolts. The reinforcements are similar in cross-sectional shape so that they can circumscribe the corrugated cross section of the filter plates such that a pair of the reinforcements can hold the filter element therebetween.

32 Claims, 18 Drawing Sheets

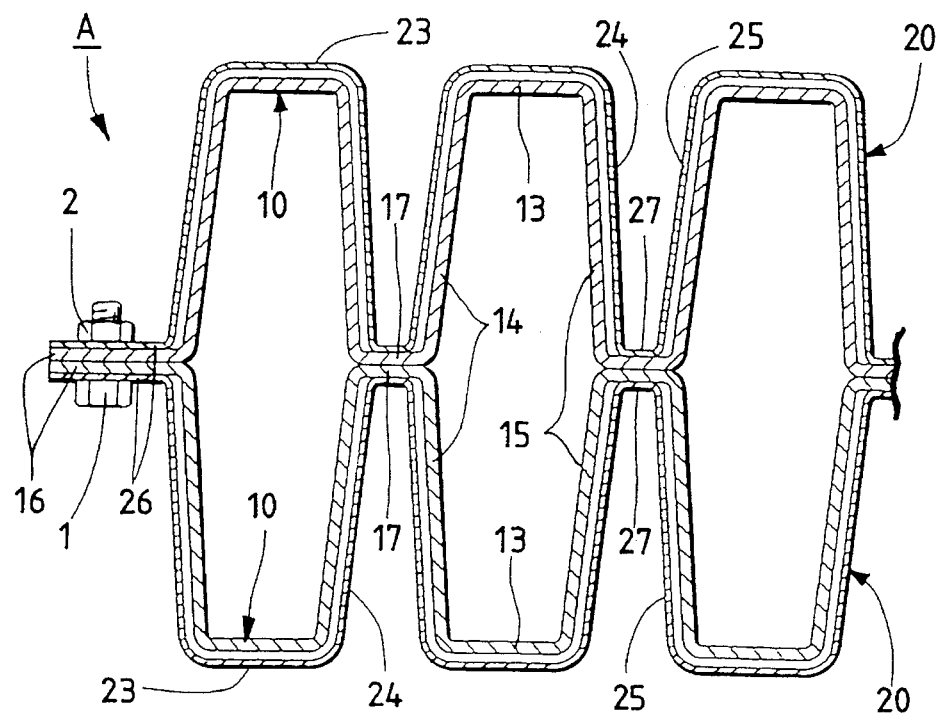
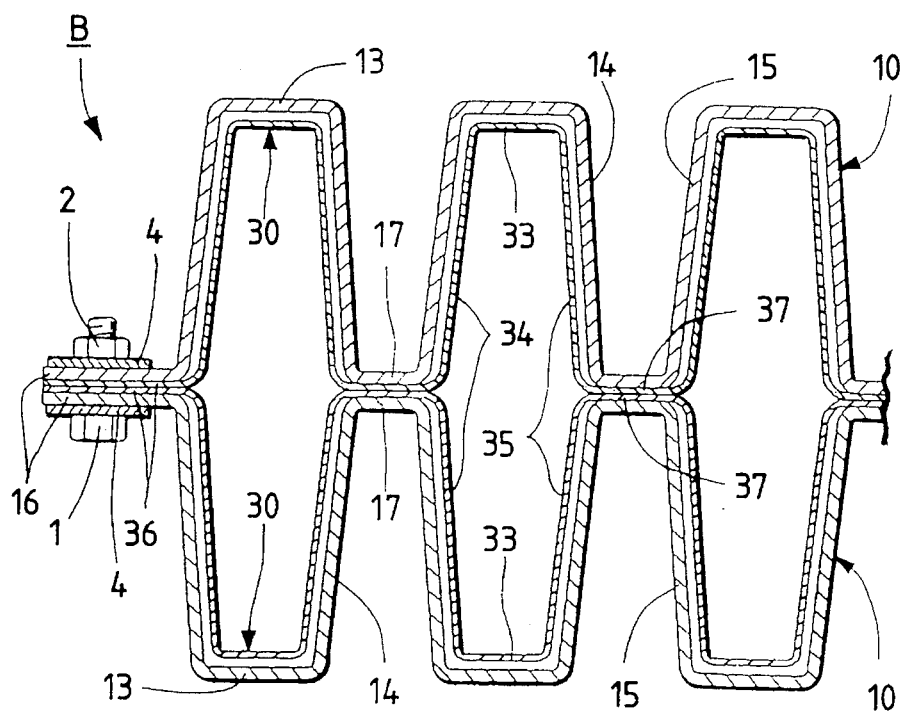

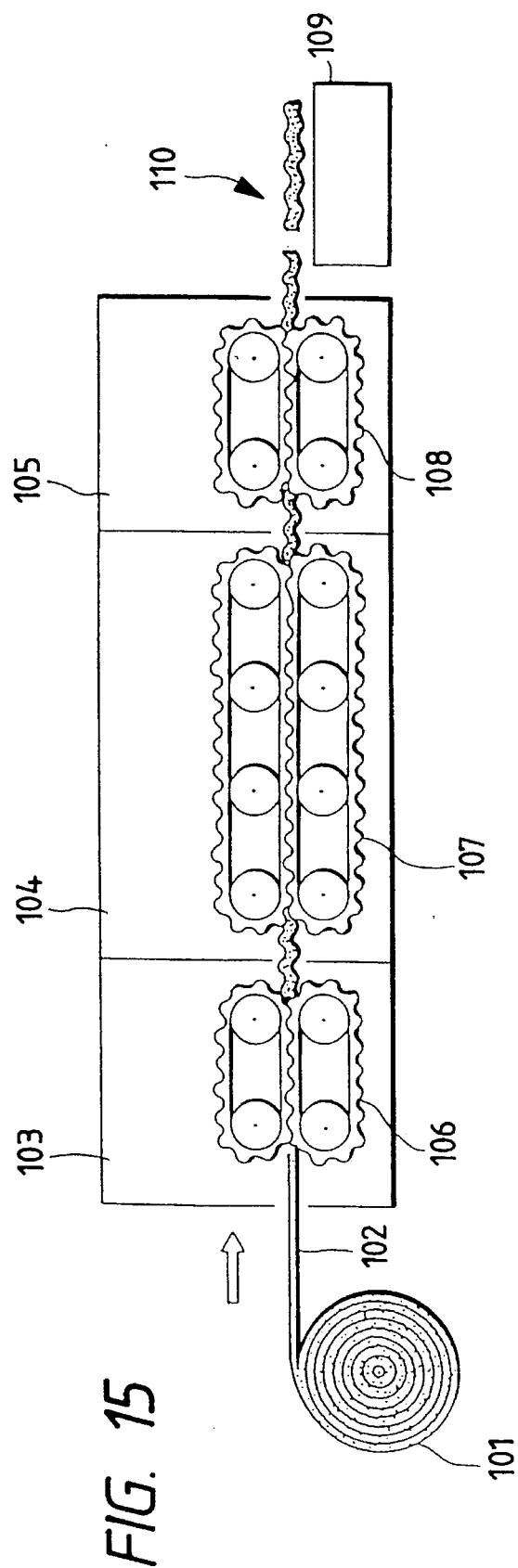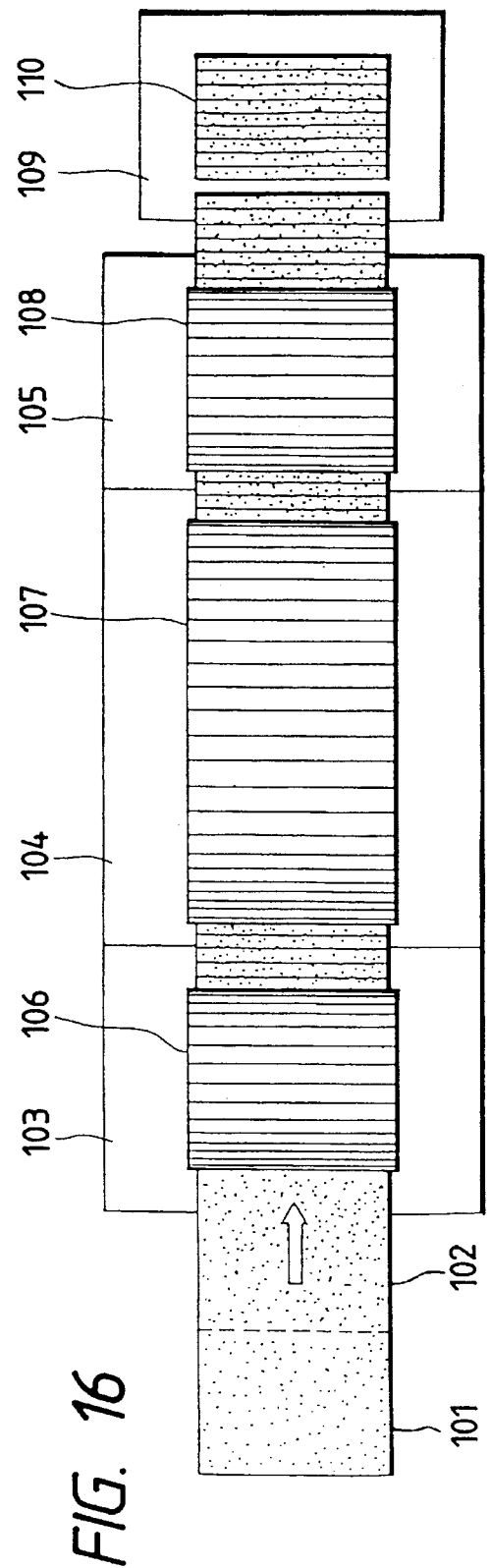
FIG. 15
FIG. 16

CONNECTING PORTION

REINFORCED FILTER ELEMENT

BACKGROUND OF THE INVENTION a) Field of the Invention

The present invention relates to filter elements used to filter the dust and dirt particles contained in vapors such as emission gases from various plants. The present invention also relates to a process of manufacturing such filter elements.

b) Description of Related Art

As is well known, hot gases generated from various plants in steel, utility, ceramic, metallurgical, chemical and other fields contain dust particles, and in order to remove them, filter elements of the type described in Unexamined Published Japanese Patent Application (Kokai) Hei. 5-277321 are used; the filter element it teaches is the combination of filter plates that are made of a nonwoven fabric or felt of a polymeric material shaped into a plate having a corrugated cross section.

To produce filter plates having a corrugated cross section, fibers of polymeric materials such as polyimides, polyphenylene sulfides, polyesters and polypropylenes are carded and needle punched to form a nonwoven fabric having a predetermined fiber density, which is then thermally cured and compressed in a press having a corrugated surface profile, whereby the fabric is shaped into a porous filter plate having a corrugated cross section.

A pair of such filter plates are brought together in such a way that the grooves in the corrugated cross section of one filter plate are placed in contact with those in the corrugated cross section of the other filter plate while the ridges in the corrugated cross section of one filter plate are opposed to those in the corrugated cross section of the other filter plate, thereby forming a filter element having a plurality of channels for the passage of the gas to be filtered.

The gas channels in this filter element are connected to an aspiration source so that the dust-containing gas to be filtered is aspirated through the filter element, whereby the dust particles in the gas are trapped on the outer surfaces of the filter plates while a clean gas is yielded within the gas channels.

Using filter plates having a corrugated cross section, the filter element described above has large enough surface areas to permit larger volumes of dust-containing gases to be treated in an efficient manner. Additionally, the sloping side walls connecting the alternating ridges and grooves in the corrugated cross section of each filter plate serve to resist the negative pressure which aspirates the dust-containing gas, thereby contributing to a higher strength of the filter plates taken as a whole.

A problem with the practice of filtering hot dust-containing gases using the aforementioned filter element shaped from nonwoven fabrics or felts of polymeric materials is that as it is used over time, the flexibility of the filter plates increases so that their corrugated geometry will deteriorate progressively under the negative pressure which aspirates the dust-containing gas and that the force of aspiration sometimes exceeds the tensile force of the filter plates to break the filter element.

In order to dislodge the dust particles that have built up on the surfaces of the filter plates, the filter element is given vibrations at periodic intervals of maintenance or a pulsed jet of air is blown into the filter element, but this also causes the problem of deformation of the corrugated filter plates or breakage of the filter element.

Thus, the conventional filter element which uses filter plates made of a nonwoven fabric or felt of polymeric materials that have been shaped into a plate of a corrugated cross section has suffered from the problems of low strength to the filtration of hot dust-containing gases and low durability to a pulsed jet of air.

SUMMARY OF THE INVENTION

The present invention has been accomplished under these circumstances and has as an object providing a filter element that uses filter plates made of a nonwoven fabric or felt of a polymeric material shaped into a plate of a corrugated cross section and which yet is improved not only in strength to the filtration of hot dust-containing gases but also in durability to a pulsed jet of air.

This object of the invention can be attained by a filter element comprising a pair of filter plates each being made of a nonwoven fabric or felt of a polymeric material that is shaped into a plate having a corrugated cross section made up of a plurality of alternating ridges and grooves, the filter plates being positioned in such a way that the grooves in one filter plate are opposed to those in the other filter plate, the filter element being reinforced with at least one reinforcement provided in a direction perpendicular to the length of the ridges and grooves, with both end portions of the reinforcement being secured to both end portions of the filter element.

The reinforcements may be selected from among the following: members that are similar in cross-sectional shape to the filter plates and which have such dimensions that they can circumscribe the ridges and grooves of the filter plates; members that are similar in cross-sectional shape to the filter plates and which have such dimensions that they can inscribe (that is, the opposite of circumscribe) the ridges and grooves of the filter plates; members in the form of strips of flat plate; and members of a generally U-shaped cross section that each has a strip of bottom plate and a pair of flanges erected at opposite ends of the bottom plate. These reinforcing members may be used either individually or in appropriate combinations.

The same object can be attained by a reinforced filter element which comprises:

a pair of reinforcements each having a corrugated cross section made up of a plurality of alternating ridges and grooves and which are positioned in such a way that the grooves in one reinforcement are opposed to those in the other reinforcement, wherein each ridge has a vertex and slopes from the ridges to the grooves are present;

filter plates each being made of a nonwoven fabric or felt of a polymeric material that is shaped into a form that is made up of a repeating corrugated cross section comprising tops covering the vertexes of the respective ridges of a reinforcement, slopes that are continuous to the tops and that extend along the slopes of a reinforcement, at least one first bottom that connects adjacent slopes of a filter plate in selected positions relatively away from a corresponding groove of a reinforcement, and at least one second bottom that extends relatively closer to a corresponding groove of a reinforcement; and connecting members that connect the filter plates and the reinforcements together at both end portions thereof.

The filter element of the invention has the filter plates reinforced with the reinforcements and, hence, its strength is so much increased that even if the flexibility of the filter plates increases as a result of the filtration of a hot dust-containing gas, they will not easily deform and, additionally, they acquire higher durability to repeated dislodging of dust particles by means of a pulsed jet of air.

If the reinforcements are similar in cross-sectional shape to the filter plates, if they have such dimensions that they can circumscribe the ridges and grooves of the filter plates, and if they are opposed to each other in such a way that the filter element is held therebetween, the corrugated geometry of the filter plates is retained by that of the reinforcements and, hence, the corrugated profile of the filter plates will not easily deform even if their flexibility increases as a result of the filtration of a hot dust-containing gas. Additionally, the deformation due to expansion of the filter plates which occurs when a pulsed jet of air is blown into the gas channels in the filter element for dislodging dust buildup is sufficiently reduced to enhance the durability of the filter element to repeated dislodging operations.

If the reinforcements are similar in cross-sectional shape to the filter plates, if they have such dimensions that they can inscribe in the ridges and grooves of the filter plates, and if they are provided inside of the filter element in such a way that they are opposed to each other, inward deformation (cave-in) of the corrugated cross section of the filter plates under the negative pressure which aspirates the gas to be filtered is sufficiently reduced by the reinforcements so that the negative pressure and, hence, the amount of aspiration, can be increased to permit the treatment of a larger volume of dust-containing gas.

Greater reinforcing effects can be achieved by combining these two types of reinforcements in appropriate ways.

Additionally, if each of the filter plates is shaped into a form that is made up of repeating corrugated cross sections each comprising tops covering the vertexes of the ridges of a reinforcement, slopes that are continuous to the tops and that extend along the slopes of the reinforcement, a first bottom that connects the slopes in selected positions, and a second bottom that extends to the groove of the reinforcement, the filter plates per se are reinforced to provide an even stronger filter element.

Besides, the filter element of the present invention can be used to collect raw material of particles dispersed and contained in gas for re-utilization.

Further, the above-noted object of the invention can also be attained by a filter element comprising a pair of filter plates each being made of a nonwoven fabric or felt of a polymeric material that is shaped into a plate having a corrugated cross section, the filter plates being positioned in such a way that the grooves in one filter plate are opposed to those in the other filter plate, characterized in that each of the filter plates is provided with integral connectors that interconnect adjacent ridges and that are integral therewith.

This filter element of the invention has adjacent ridges in the corrugated cross section of each filter plate interconnected with connectors and, hence, the corrugated cross section of the filter plates will not easily bend at corners and can be effectively protected against deformation even if the flexibility of the filter plates increases upon filtration of a hot dust-containing gas.

The connectors which interconnect adjacent ridges in the corrugated cross section of each filter plate also serve to reinforce the filter plates per se and, hence, not only their durability to repeated application of a pulsed jet of air is enhanced but also the negative pressure for aspirating the dust-containing gas can be sufficiently increased to improve the capacity for the treatment of the dust-containing gas.

Another object of the present invention is to provide a preferable process by which gas-permeable shaped articles such as filter elements having the below-mentioned characteristics can be produced with high efficiency, requiring smaller efforts on the side of operators:

(1) availability in small to large sizes with minimum thickness;
(2) availability of gas permeability through various mesh sizes;
(3) low likelihood of clogging to assure prolonged service life;
(4) high heat resistance;
(5) availability of desired shapes with large surface areas; and
(6) having a cell structure that permits efficient backwashing.

The above-stated object of the invention can be attained by the following process:

A process for producing a shaped article of highly heat-resistant polyimide fibers having recurring units of the following general formula (I):

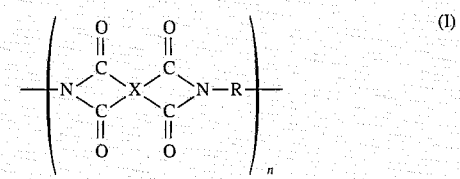

wherein n is an integer greater than one; x is a tetravalent aromatic group selected from the group consisting of

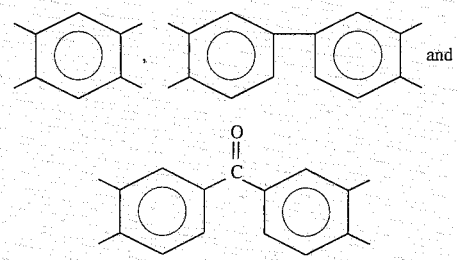

and R is at least one divalent aromatic group selected from the group consisting of

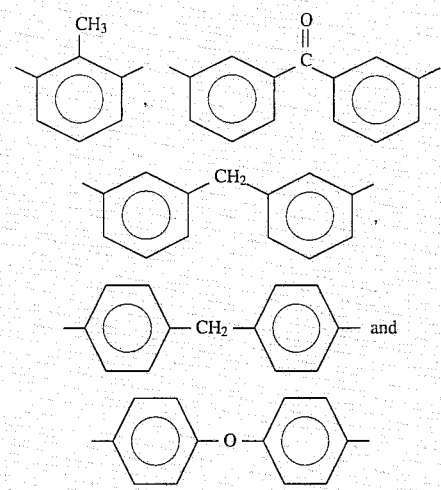

the shaped article of the polyimide fibers being gas-permeable and having a bulk density of 0.5 to 1 g/cm³, wherein the process comprises the steps of forming a nonwoven fabric or felt from the highly heat-resistant polyimide fibers, then corrugating the nonwoven fabric or felt by transversal or longitudinal passage through successive stages of preheating, molding and cooling using caterpillar molds or grooved rolls and, subsequently, joining two members of the corrugated nonwoven fabric or felt together, thereby fabricating a filter element with corrugated surfaces that is rigid enough to be self-supporting.

BRIEF DESCRIPTION OF THE DRAWINGS

FIG. 8 is section 8—8 of FIG. 1.

FIG. 9 is a cross section showing the essential part of the reinforced filter element of Example 2 of the invention.

FIG. 15 is a side view of a corrugator that may be used to implement the process of the invention using caterpillar molds.

FIG. 16 is a plan view of the corrugator shown in FIG. 15.

DETAILED DESCRIPTION OF THE INVENTION

Examples of a filter element that is reinforced according to the present invention will now be described in detail with reference to the accompanying drawings. It should be noted that the reinforced filter element of the invention is in no way limited by the following explanation and the accompanying drawings and that various modifications can of course be made without departing from the spirit and scope of the invention.

Figure 1:
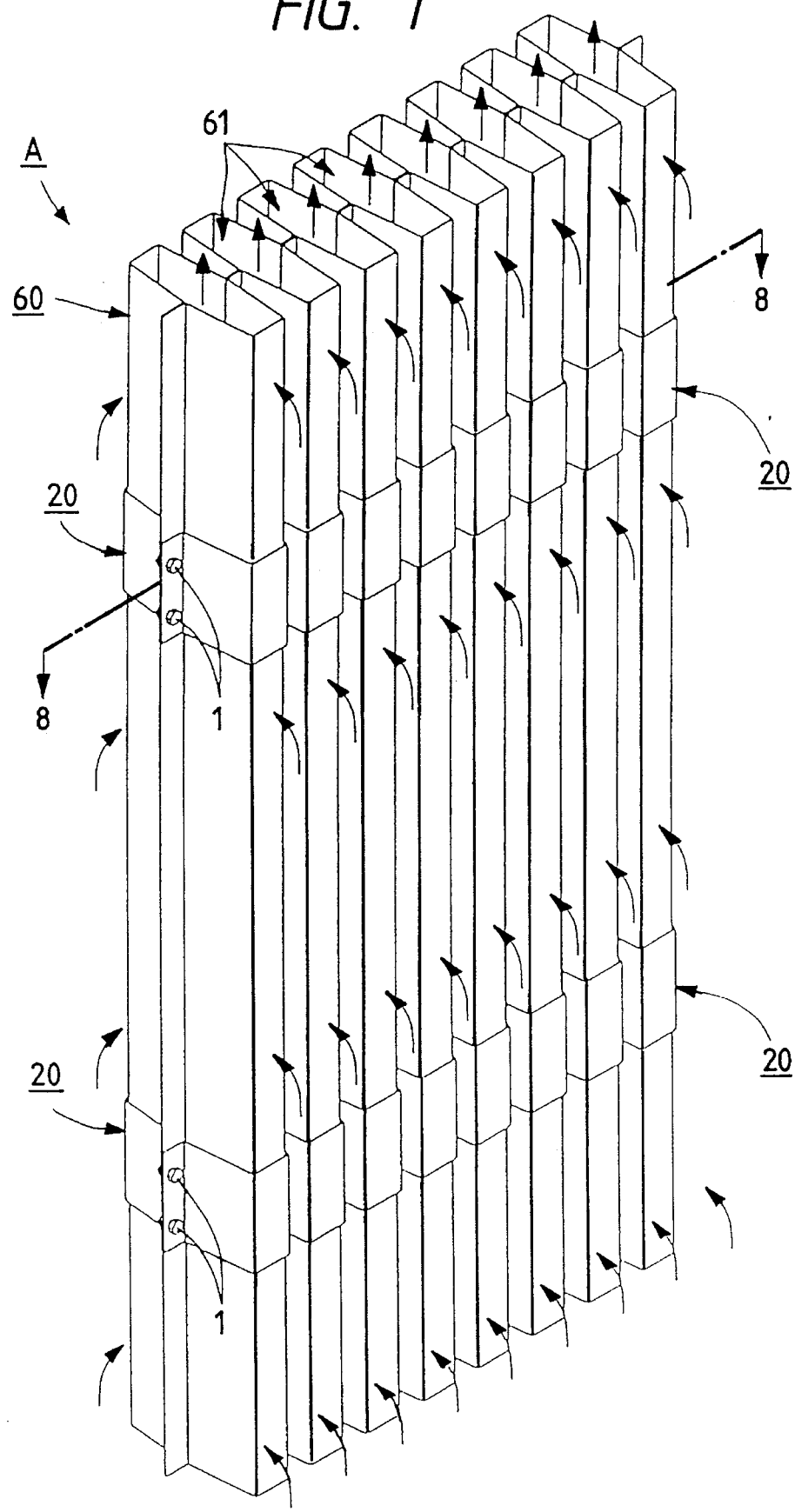
FIG. 1 is a perspective view of the reinforced filter element of Example 1 of the invention.

FIG. 1 is a perspective view of the reinforced filter element of Example 1 according to the present invention. FIG. 8 is section 8—8 of FIG. 1. The reinforced filter element generally indicated by A comprises a pair of filter plates 10 having a corrugated cross section and two pairs of reinforcements 20 with a corrugated cross section that extend along the outer surfaces of the filter plates.

The filter plates 10 are each made of a polyimide felt having an areal density of 500 g/cm$^2$, a thickness of 2.0 mm, a width of 3,000 mm and a length of 1,500 mm, which has been set up and held in a mold at 320° C. for 30 min to be shaped into a dense and rigid plate of a corrugated cross section that measures 1,000 mm wide and 1,500 mm long.

Figure 2:
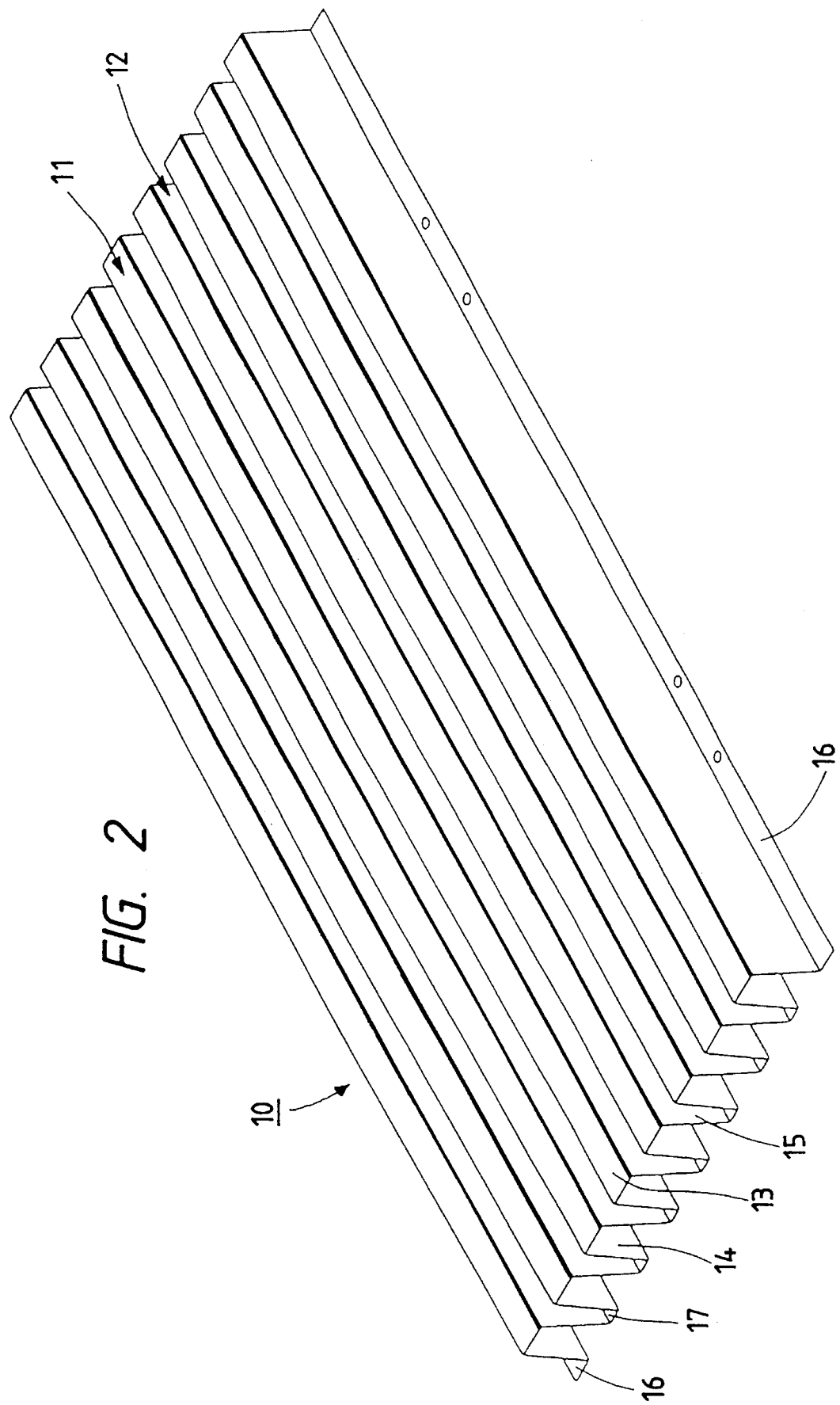
FIG. 2 is a perspective view of a filter plate.

As shown specifically in FIG. 2, each of the filter plates 10 comprises alternating, parallel ridges 11 and grooves 12; each ridge 11 is defined by a top 13 as a flat plate and by a pair of opposed slopes 14 and 15, and each groove 12 is defined by a bottom 17 as a flat plate spaced from the top 13 and extending parallel thereto and by the pair of slopes 14 and 15. Each filter plate also has a pair of flanges 16 that are located in opposite end portions of its width and which extend flush with the bottom 17.

Figure 3:
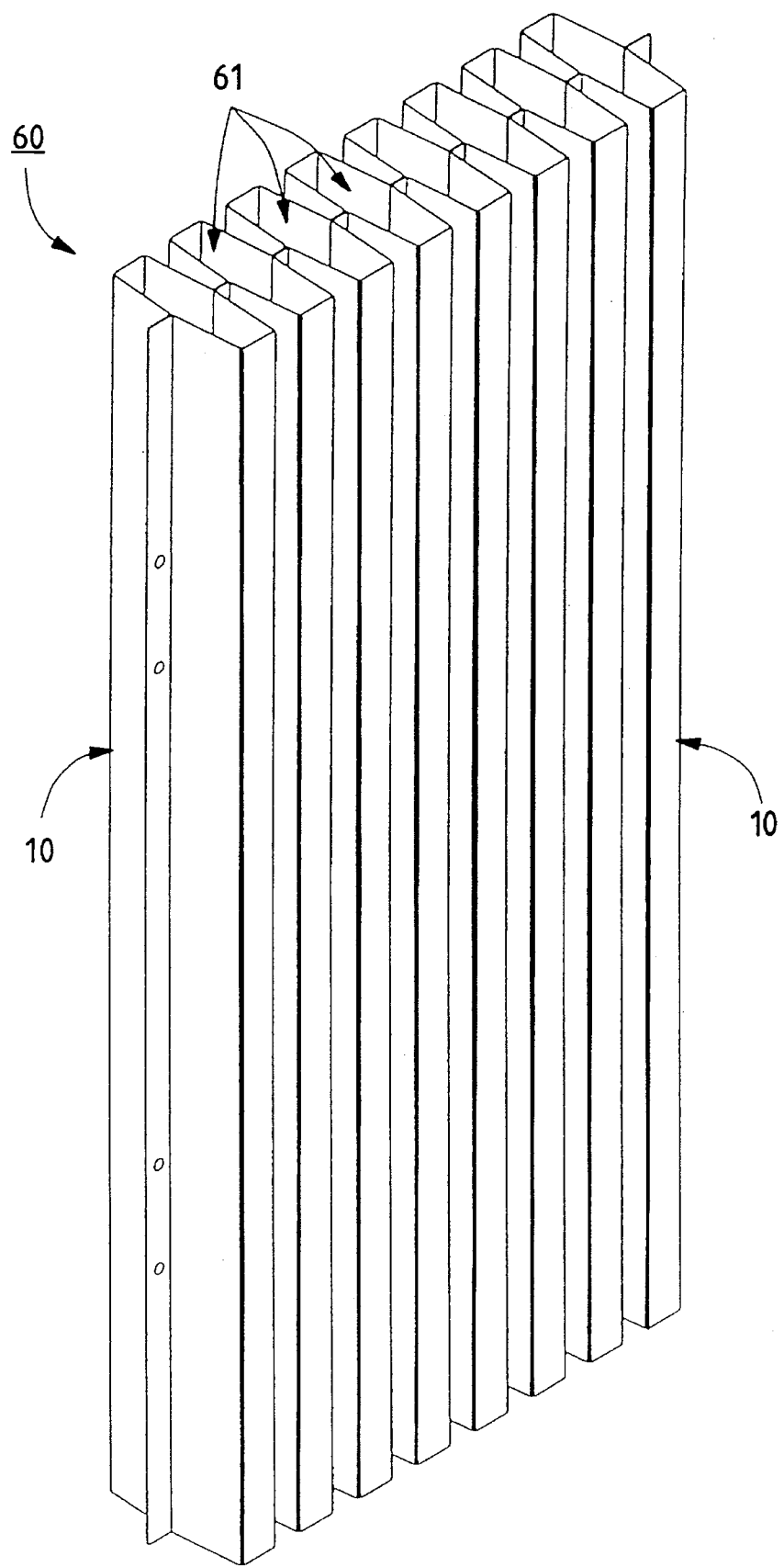
FIG. 3 is a perspective view of a filter element shaped by combining two units of the filter plate shown in FIG. 2.

As shown in FIG. 3, a pair of filter plates 10 are combined together in such a way that the ridges 13 of one filter plate are opposed those of the other filter plate while the bottom 17 of the grooves 12 and the flange 16 of one filter plate are placed in contact with those of the other filter plate. The thus combined filter plates are bonded to each other to define a plurality of gas channels 61 (in the case shown, the filter element 60 has 8 gas channels). The filter element 60 is generally are equipped at its upper end part with a connecting portion (not shown) that is to be connected to a top plate of a container of a dust collector, while the lower end part of the filter element 60 is closed with a suitable means.

Figure 4:
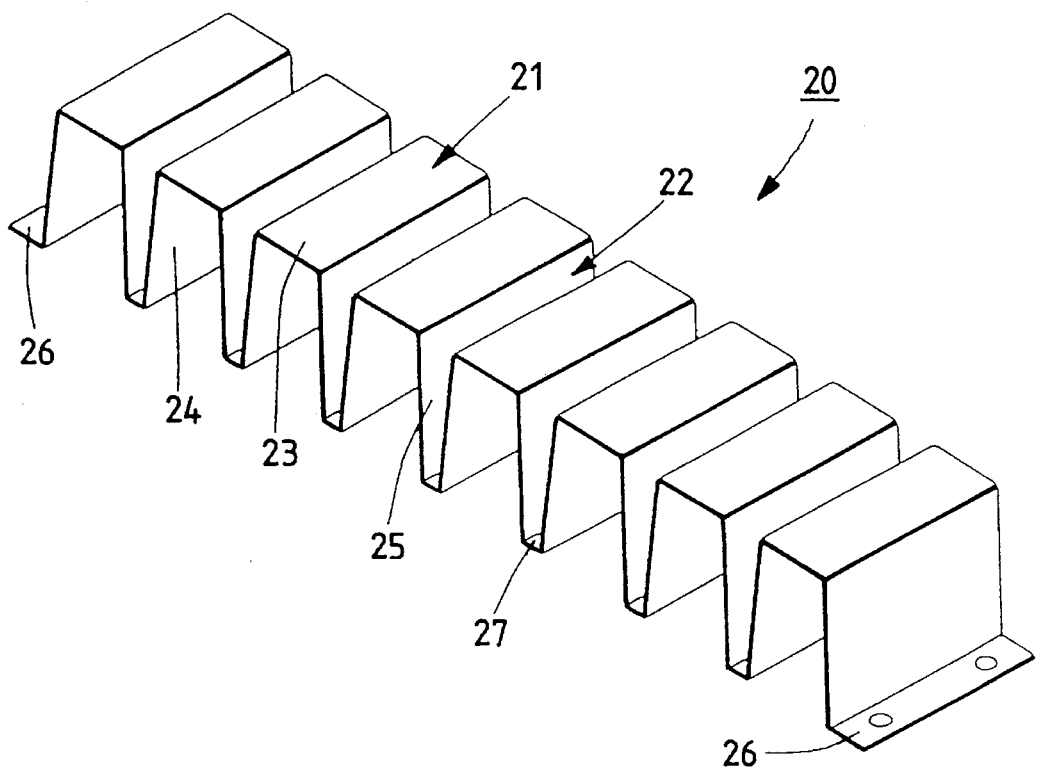
FIG. 4 is a perspective view of one type of reinforcement.

Each of the reinforcements 20 is formed by bending a metal strip into a shape having a corrugated cross section. As shown specifically in FIG. 4, each reinforcement 20 comprises alternating, parallel ridges 21 and grooves 22; each ridge 21 is defined by a top 23 as a flat plate and by a pair of opposed slopes 24 and 25, and each groove 22 is defined by a bottom 27 as a flat plate spaced from the top 23 and extending parallel thereto and by the pair of slopes 24 and 25. Each reinforcement 20 also has a pair of flanges 26 that are located in opposite end portions of its width and which extend flush with the bottom 27.

The corrugated cross section of each reinforcement 20 which is made up of alternating ridges 21 and grooves 22 is similar in shape to the corrugated cross section of each filter plate 10; additionally, in order to ensure that the corrugated cross section of each reinforcement 20 can circumscribe with the ridges 13 and grooves 17 of each filter plate 10, the top 23 of the ridge 21 is formed in a larger size than the width of the ridge 13 of each filter plate 10, while the bottom 27 of the groove 22 is formed in a smaller size than the width of the groove 17 of the filter plate.

When the reinforcements 20 are mounted on the filter element 60, the tops 23 extend as spaced from the tops 13 of the filter plates 10 and the pair of slopes 24 and 25 also extend as spaced from the pair of slopes 14 and 15 of the filter plates 10 but, on the other hand, the bottoms 27 are placed in contact with the outer surfaces of the bottoms 17 of the filter plates 10 and the flanges 26 are also placed in contact with the outer surfaces of the flanges 16 of the filter plates 10 (see FIG. 8).

As shown in FIG. 8, the reinforcements 20 which pair up in more than one set (in two sets in the case shown in FIG. 1) hold the filter element 60 therebetween and, in addition, the superposed filter plates 10 and reinforcements 20 are fastened together at the respective flanges 16 and 26 by means of bolts 1 and nuts 2, whereby the reinforced filter element A of Example 1 is completed.

If necessary, the reinforcements 20 may be provided on the filter plates 10 in areas that will be the antinodes of flexural vibrations in the longitudinal direction. This proves to be more effective in suppressing the filter plates 10 from experiencing torsion and other deformations in the longitudinal direction.

Thus, the reinforced filter element A of Example 1 has the filter plates 10 reinforced by means of the reinforcements 20 which extend along their outer surfaces and, hence, even if the temperature of the filter plates 10 rises to make them increasingly flexible as a result of the filtration of a hot dust-containing gas, the corrugated cross-sectional geometry of the filter plates 10 can be maintained without deformation, and the areas effective for the filtration of dust or dirt particles can be held at a correspondingly high value.

If high-pressure air is admitted into the filter element 60 for backwashing purposes, the deformation due to expansion of the filter plates 10 can be effectively prevented by the reinforcements 20 and, hence, the filter plates 10 are protected against deformation of their corrugation.

Additionally, the reinforced filter element A of Example 1 has a clearance provided between each of the ridges 11 on the filter plate 10 and each of the ridges 21 on the reinforcement 20; hence, when the filter element 60 is given small vibrations to dislodge the dust and dirt buildup from the surfaces of that filter element, the ridges 11 on the filter plates 10 will not rub against the ridges 21 on the reinforcements 20, thereby ensuring that the filter plates 10 will not wear out to breakdown.

In Example 1, the reinforcements 20 are shaped from a metal strip, but this is not the sole case of the invention, and they may be shaped from other materials such as heat-resistant plastic plates, carbon fiber plates, glass fiber plates and ceramic plates. If desired, a plurality of through-holes may be formed in the reinforcements to insure that unimpeded flows of the dust-containing gas are provided.

FIG. 9 is a cross section showing the essential part of the reinforced filter element of Example 2 according to the present invention. The reinforced filter element generally indicated by B is the same as what is described in Example 1, except that the reinforcements 20 are replaced by reinforcements 30 having a cross-sectional shape that can inscribe the filter plates 10.

Figure 5:
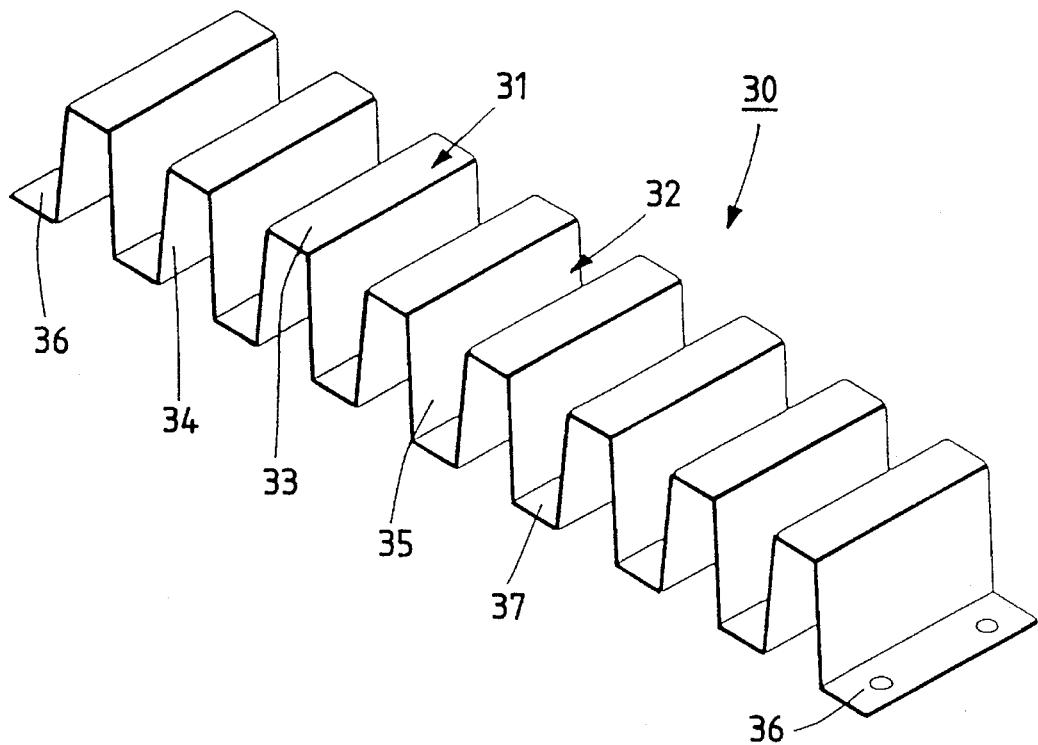
FIG. 5 is a perspective view of another type of reinforcement.

Each of the reinforcements 30 is formed by bending a metal strip into a shape having a corrugated cross section. As shown specifically in FIG. 5, each reinforcement 30 comprises alternating, parallel ridges 31 and grooves 32; each ridge 31 is formed of a top 33 as a flat plate and a pair of slopes 34 and 35, and groove 32 is formed of a bottom 37 as a flat plate spaced from the top 33 and extending parallel thereto and the pair of slopes 34 and 35. Each reinforcement 30 also has a pair of flanges 36 that are located in opposite end portions of its width and which extend flush with the bottom 37.

The corrugated cross section of each reinforcement 30 which is made up of alternating ridges 31 and grooves 32 is similar in shape to the corrugated cross section of each filter plate 10; additionally, in order to ensure that the corrugated cross section of each reinforcement 30 can inscribe the ridges 13 and grooves 17 of each filter plate 10, the top 33 of the ridge 31 is formed in a smaller size than the width of the ridge 13 of each filter plate 10 while the bottom 37 of the groove 32 is formed in a larger size than the width of the groove 17 of the filter plate.

When a pair of reinforcements 30 are opposed to each other and mounted on the back sides of the filter plates 10, the tops 33 extend as spaced from the tops 13 of the filter plates 10, and the pair of slopes 34 and 35 also extend as spaced from the pair of slopes 14 and 15 of the filter plates 10, but, on the other hand, the bottoms 37 are placed in contact with the inner surfaces of the bottoms 17 of the filter plates 10, and the flanges 36 are also placed in contact with the inner surfaces of the flanges 16 of the filter plates 10.

Additionally, the superposed filter plates 10 and reinforcing members 30 are fastened together at the respective flanges 16 and 36 by means of bolts 1 and nuts 2 with strength plates 4, whereby the reinforced filter element B of Example 2 is completed.

Thus, the reinforced filter element B of Example 2 has the filter plates 10 reinforced by means of the reinforcements 30 which extend along their inner surfaces and, hence, even if the temperature of the filter plates 10 rises to make them increasingly flexible as a result of the filtration of a hot dust-containing gas, the corrugated profile of the filter plates 10 will not readily deform and, hence, the areas effective for the filtration of dust or dirt particles can be held at a correspondingly high value.

As a further advantage, the negative pressure for aspirating the dust-containing gas can be set at high levels without increasing the chance of the filter plates 10 yielding to the negative pressure, whereby the corrugated profile of the filter plates 10 can be ensured against deformation.

Additionally, the reinforced filter element B of Example 2 has a clearance provided between each of the ridges 11 on the filter plate 10 and each of the ridges 31 on the reinforcement 30; hence, when the filter element 60 is given small vibrations to dislodge the dust and dirt buildup from the surfaces of that filter element, the ridges 11 on the filter plates 10 will not rub against the ridges 31 on the reinforcements 30, thereby ensuring that the filter plates 10 will not wear out to breakdown.

In Example 2, the reinforcements 30 are shaped from a metal strip but this is not the sole case of the invention, and they may be shaped from other materials such as heat-resistant plastic plates, carbon fiber plates, glass fiber plates and ceramic plates. Alternatively, a plurality of through-holes may be formed in the reinforcements to insure that unimpeded flows of the dust-containing gas are provided.

Figure 10:
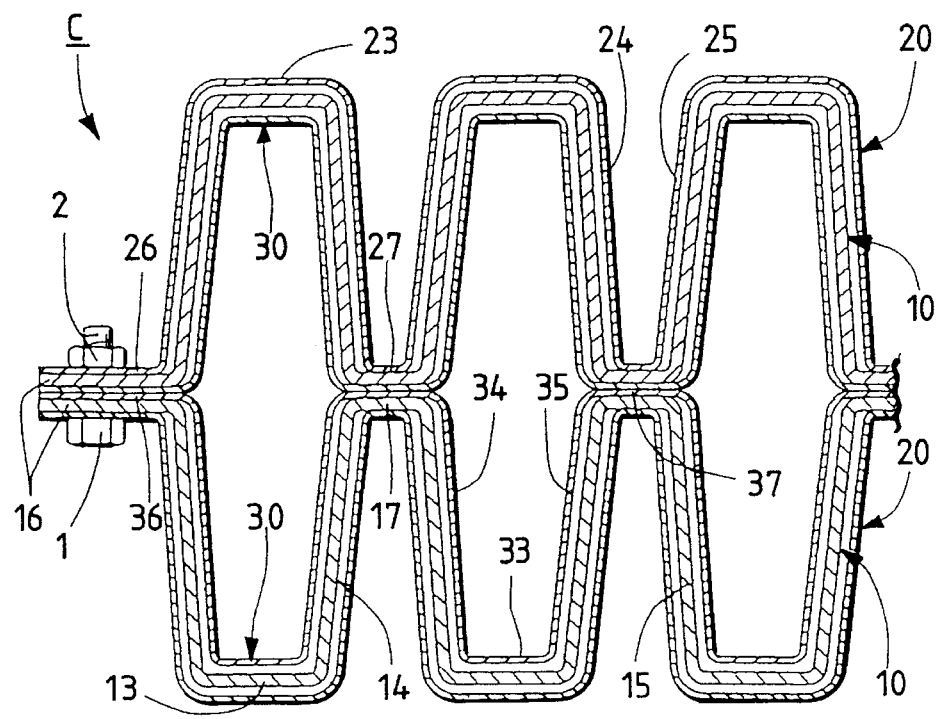
FIG. 10 is a cross section showing the essential part of the reinforced filter element of Example 3 of the invention.

FIG. 10 is a cross section showing the essential part of the reinforced filter element of Example 3 according to the present invention. The reinforced filter element generally indicated by C is the same as the combination of Examples 1 and 2, in which the filter plates 10 are reinforced by being held between the reinforcement 20 fitted outside and the reinforcement 30 fitted inside.

Thus, the reinforced filter element C of Example 3 has the filter plates 10 reinforced by means of the reinforcement 20 (the first type of reinforcing member) which extend along their outer surfaces and the reinforcements 30 (the second type of reinforcing member) which extend along their inner surfaces; hence, even if the flexibility of the filter plates 10 increases as a result of the filtration of a hot dust-containing gas, the corrugated profile of the filter plates 10 will not readily deform. Thus, the areas effective for the filtration of dust or dirt particles can be held at a correspondingly high value.

If high-pressure air is admitted into the filter element 60 for backwashing purposes, the deformation due to expansion of the filter plates 10 can be effectively prevented by the first type of reinforcing member 20; as a further advantage, the negative pressure for aspirating the dust-containing gas can be set at high levels without increasing the chance of the filter plates 10 of yielding to the negative pressure, whereby the corrugated profile of the filter plates 10 can be ensured against deformation.

Additionally, the reinforced filter element C of Example 3 has a clearance provided both between the top 13 of the filter plate 10 and the top 23 of the first type of reinforcing member 20 and between the top 13 and the top 33 of the second type of reinforcing member 30; hence, when the filter element 60 is given small vibrations to dislodge the dust and dirt buildup from the surfaces of that filter element, the tops 13 of the filter plates 10 will not rub against either the tops 23 of the first type of reinforcing member 20 or the tops 33 of the second type of reinforcing member 30, thereby ensuring that the filter plates 10 will not wear out to breakdown.

Figure 6:
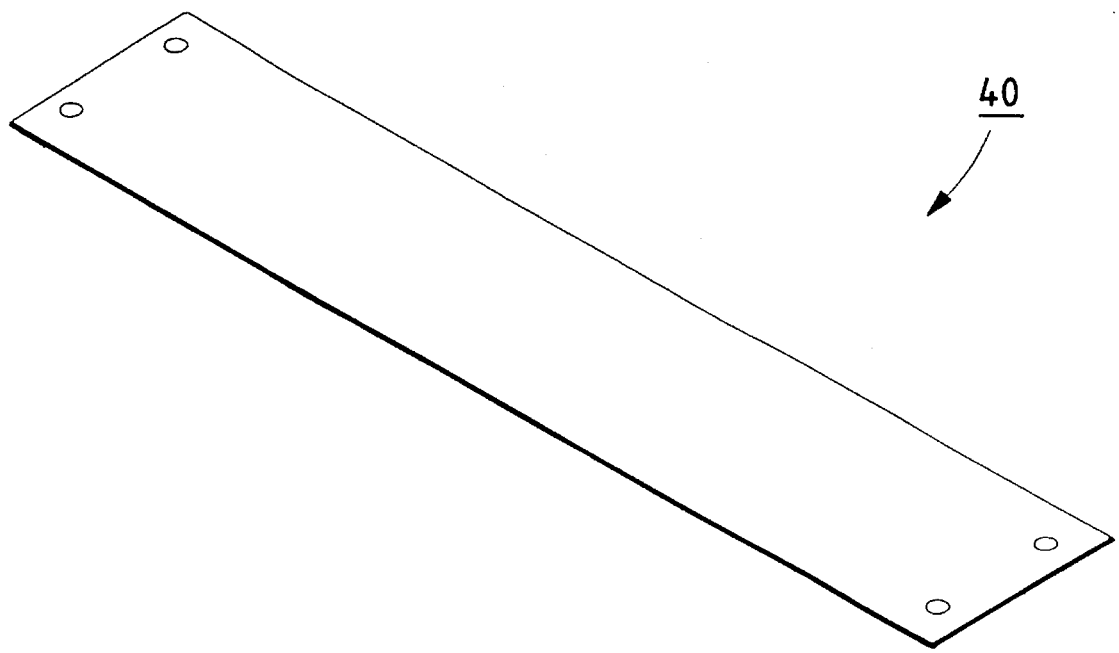
FIG. 6 is a perspective view of yet another type of reinforcement.
Figure 11:
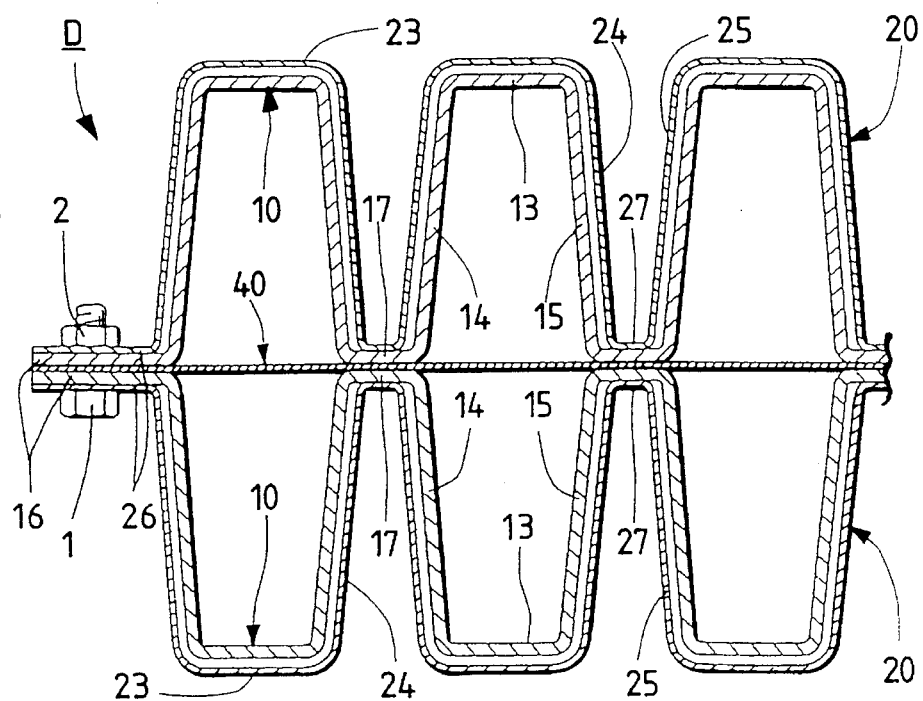
FIG. 11 is a cross section showing the essential part of the reinforced filter element of Example 4 of the invention.

FIG. 11 is a cross section showing the essential part of the reinforced filter element of Example 4 according to the present invention. The reinforced filter element generally indicated by D is the same as what is described in Example 3, except that the reinforcements 30 are replaced by a reinforcement 40 in the form of a flat plate as shown in FIG. 6.

Thus, the reinforced filter element D uses the reinforcements 20 (see FIG. 4) as the first type of reinforcing member and the reinforcement 40 (see FIG. 6) as the second type of reinforcing member, which is opposed to the first type of reinforcing member 20 in such a way that it is held between the filter plates 10.

Compared to the reinforced filter element A of Example 1 which uses only the reinforcements 20, the reinforced filter element D having the above-described construction not only assures that the filter plates 10 as reinforced by the reinforcement 40 in the form of a flat plate are provided with higher rigidity, but it also proves to be more effective in reducing the possible dimensional changes in the width of the filter plates 10.

Figure 7:
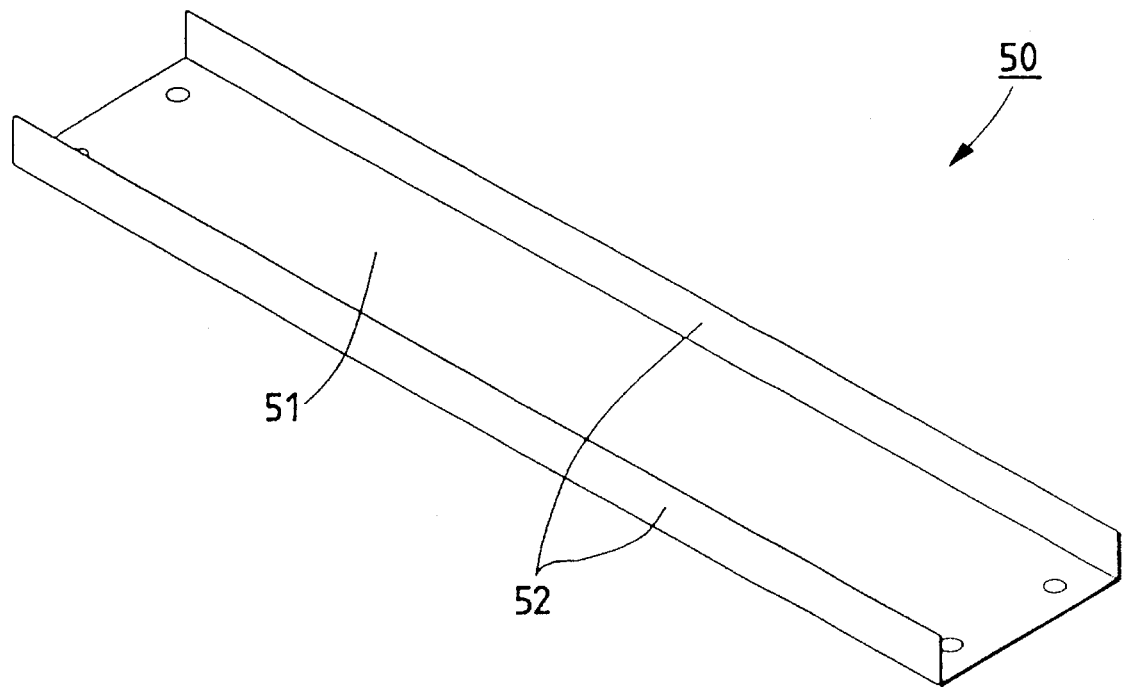
FIG. 7 is a perspective view of still another type of reinforcement.
Figure 12:
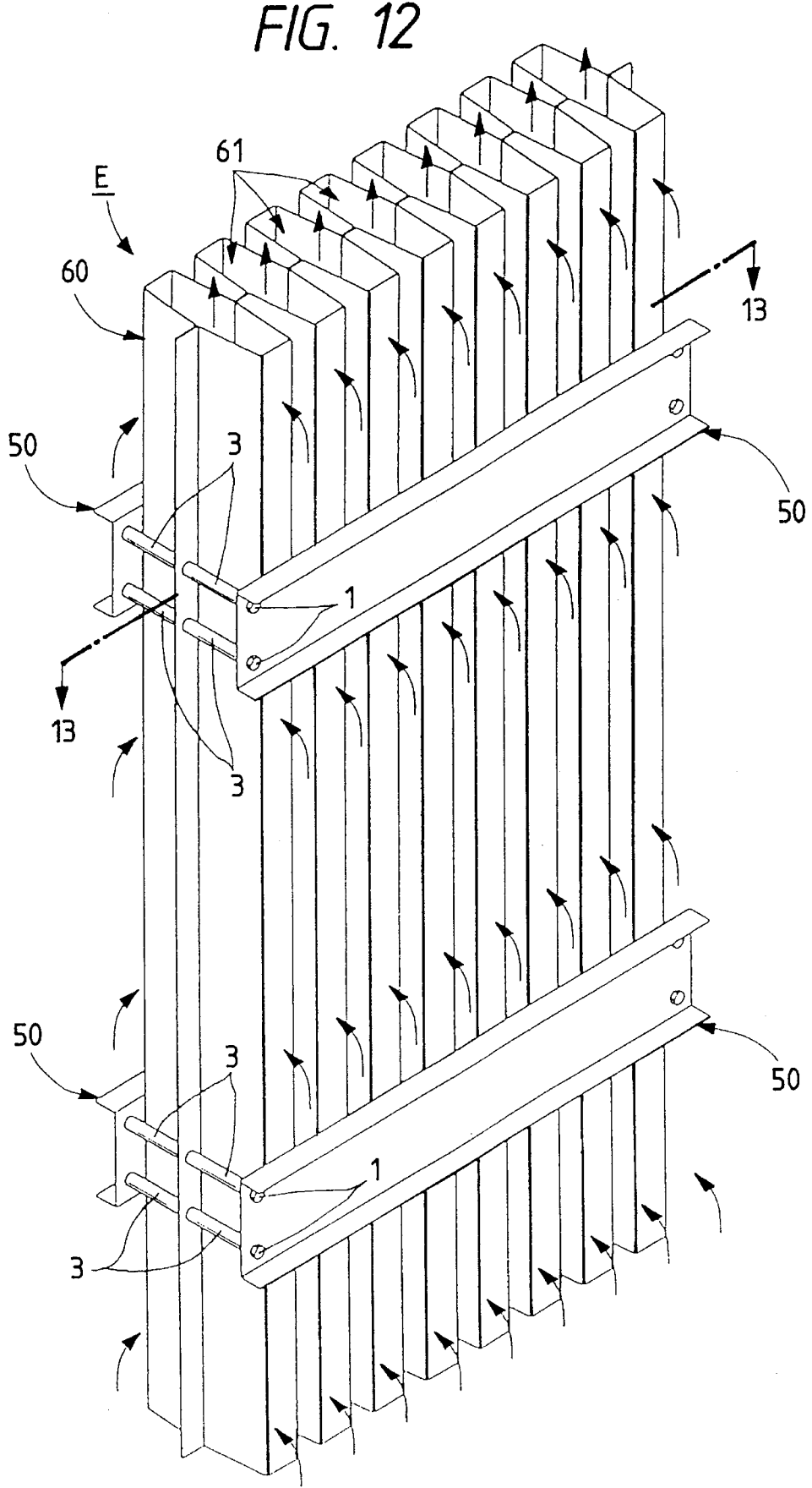
FIG. 12 is a perspective view of the reinforced filter element of Example 5 of the invention.
Figure 13:
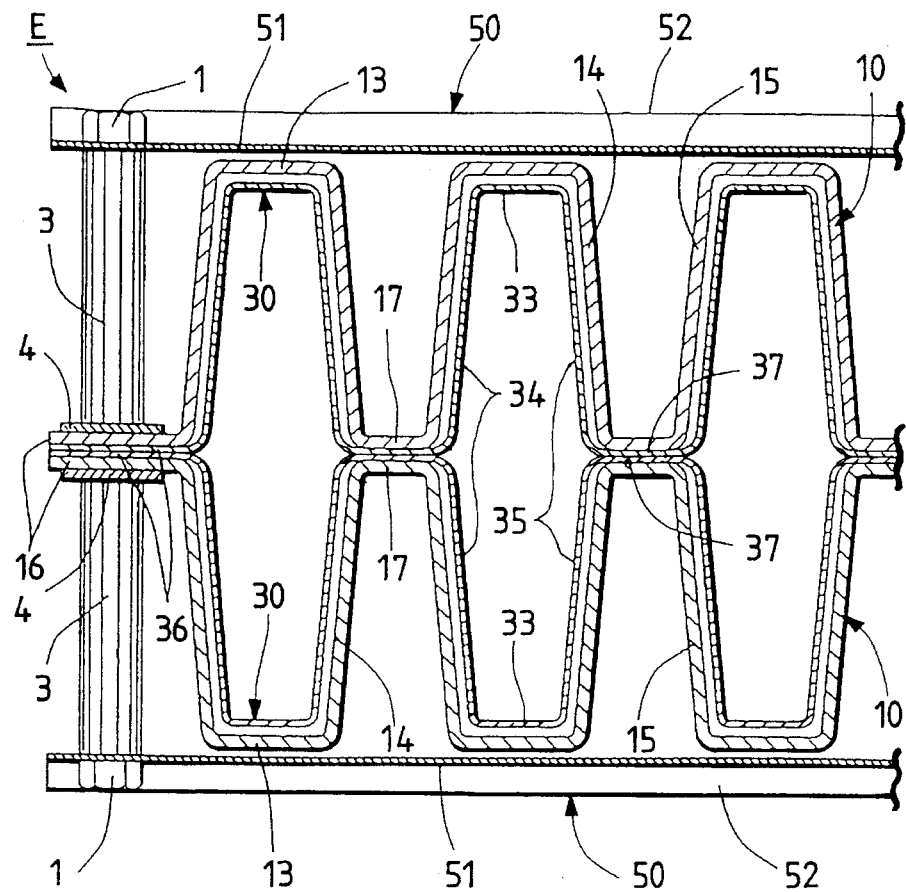
FIG. 13 is section 13—13 of FIG. 12.

FIG. 12 is a perspective view of the reinforced filter element of Example 5 according to the present invention. FIG. 13 is section 13—13 of FIG. 12. The reinforced filter element generally indicated by E is the same as what is described in Example 3, except that the reinforcements 20 are replaced by reinforcements 50 having a U-shaped cross section of bottom 51 and flanges 52 in FIG. 7.

Thus, the reinforced filter element E uses the reinforcements 30 (see FIG. 5) as the first type of reinforcing member and the reinforcements 50 (see FIG. 7) as the second type of reinforcing member, which are opposed to the first type of reinforcing member 30 in such a way that they are provided on both sides that are exterior to the filter element 60, with the flanges 36 of the first type of reinforcing members 30 being fastened integrally to the flanges 16 of the filter plates 10 with the intermediary of tubular stays 3.

Compared to the reinforced filter element B of Example 2 which uses only the reinforcements 30, the reinforced filter element E having the above-described construction not only assures that the filter plates as reinforced by the second type of reinforcing member 50 in a U-shaped cross section are provided with higher rigidity, but it also proves to be more effective in reducing the possible dimensional changes in the width of the filter plates 10.

Figure 14:
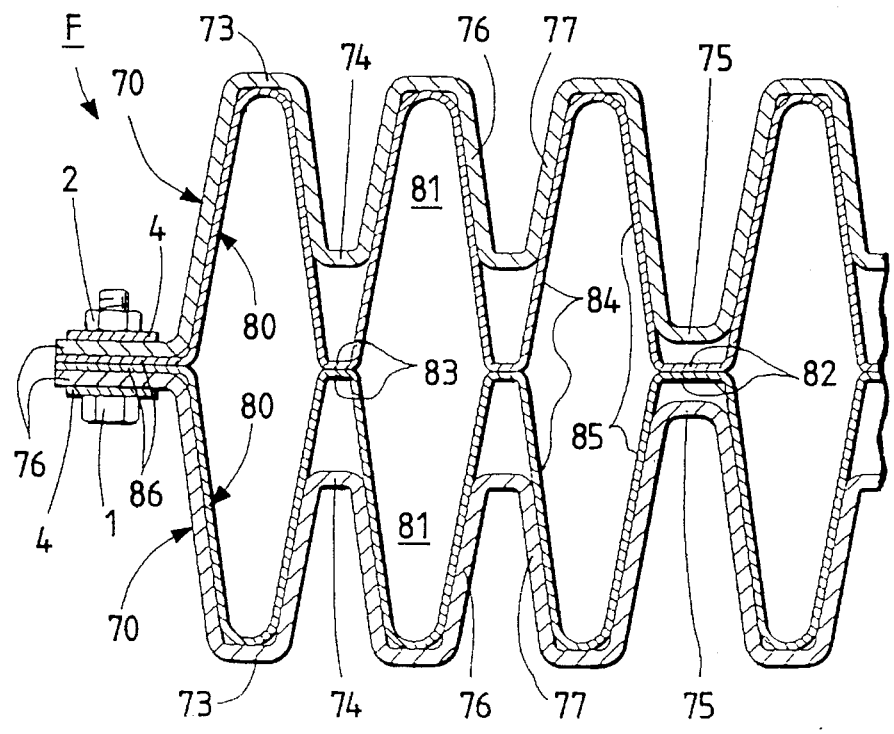
FIG. 14 is a cross section showing the essential part of the reinforced filter element of Example 6 of the invention.

FIG. 14 is a cross section showing the essential part of the reinforced filter element of Example 6 according to the present invention. Shown in Examples 1 to 5 are reinforced filter elements that use reinforcements of various designs or which use various combinations of reinforcements. In contrast, Example 6 relates to a reinforced filter element, generally indicated by F, that employs uniquely shaped filter plates.

The reinforcements generally indicated by 80 are made of a metal strip that is bent to have a corrugated cross section. Each reinforcement comprises alternating, parallel ridges 81 and bottoms 82 and 83 in the form of flat plates. Each ridge 81 is formed of a pair of slopes 84 and 85 while the bottoms 82 and 83 are grooves with respect to the ridges 81 and coextensive with the slopes 84 and 85. Each reinforcement 80 also has a pair of flanges 86 that are located in opposite end portions of its width and which extend flush with the bottoms 82 and 83.

The filter plates generally indicated by 70 each have a corrugated cross section comprising basically a top 73 that covers the vertex of ridge 81 in the reinforcement 80, slopes 76 and 77 that are continuous to the top 73 and that extend along the slopes 84 and 85 of the reinforcement 80, the first bottom 74 that connects the slopes 76 and 77 in selected positions, say, generally intermediate positions, and the second bottom 75 that extends to the bottom 82 of the reinforcement 80. In the case shown in FIG. 14, the corrugated cross section of each filter plate 70 is made up of repetitions of two units of the first bottom 74 and three units of the top 73; alternatively, the first bottom 74 may alternate with the second bottom 75 to form a repeating unit.

To assure uniformity in the strength of the filter plates 70, the first and second bottoms 74 and 75 of the filter plate 70 are preferably equal in width (the spacing between adjacent ridges). Hence, the bottoms 82 and 83 of the reinforcement 80 are so designed that the bottom 83 which is opposed to the first bottom 74 of the filter plate 70 is smaller in width than the bottom 82 which is opposed to the second bottom 75 of the filter plate 70.

To complete the reinforced filter element F of Example 6, a pair of reinforcements 80 which are opposed to each other in such a way that their respective bottoms 82 and 83 contact each other are mounted on the back sides of the filter plates 70 and the thus superposed filter plates 70 and reinforcements 80 are fastened together at the respective flanges 76 and 86 by means of bolts 1 and nuts 2 with strength plates 4.

The reinforced filter element F of Example 6 is similar to the reinforced filter element B of Example 2 in that the filter plates 70 are reinforced by means of the reinforcements 80 extending along their inner surfaces. Hence, the reinforced filter element F of Example 6 brings about the same effects as the reinforced filter element B of Example 2, and this is augmented by the increase in the strength of the filter plates 70 per se which is achieved by connecting the slopes 76 and 77 by means of the first bottom 74.

The reinforced filter elements fabricated in Examples 1 to 6 were subjected to a filtration test under accelerated deterioration conditions in which the filtration temperature was set at 270° C., which was higher than the commonly employed value, and in which the dislodging of dust particles with a pulsed jet of air was performed at 12-sec intervals, which were shorter than in the normal operation. The feed gas to be filtered contained 5 g/Nm$^3$ of Kanto Loam (Class 11 in JIS) as dust, and it was processed at a rate of 1 m/min. The amount of dust particles contained in the filtered gas was measured with a digital dust monitor of Shibata Scientific Technology, Ltd. operating on the integration of light scattering.

When the measured amount of dust particles exceeded 0.5 mg/Nm$^3$, the filter element under test was considered to have failed. The test results are shown in Table 1 below in terms of the time to failure.

For comparison, a pair of the same filter plates as used in Example 1 were placed in such a way that the grooves of one filter plate were opposed to those of the other filter plate to fabricate a filter element of the configuration shown in FIG. 3; no reinforcements were used in the fabrication of that filter element. The comparison filter element was subjected to the same filtration test as described in the previous paragraph, and the test result is also shown in Table 1.

TABLE 1

| Reinforced filter element | Time to failure, h |
|---|---|
| Ex. 1 | 120 |
| Ex. 2 | 264 |
| Ex. 3 | 432 |
| Ex. 4 | 180 |
| Ex. 5 | 158 |
| Ex. 6 | 405 |
| Comp. Ex. | 64 |

Obviously, the mounting of the reinforcements was effective in extending the time to failure by a substantial degree.

Having the structural features described in the foregoing, the filter element of the invention has been found to offer the following outstanding advantages.

The filter element of the invention has the filter plates reinforced with reinforcements and, hence, its strength is so much increased that even if the flexibility of the filter plates increases as a result of the filtration of a hot dust-containing gas, they will not easily deform and, additionally, they acquire higher durability to repeated dislodging of dust particles by means of a pulsed jet of air.

If the reinforcements are similar in cross-sectional shape to the filter plates, if they have such dimensions that they can circumscribe the ridges and grooves of the filter plates, and if they are opposed to each other in such a way that the filter element is held therebetween, the corrugated geometry of the filter plates is retained by that of the reinforcements and, hence, the corrugated profile of the filter plates will not easily deform even if their flexibility increases as a result of the filtration of a hot dust-containing gas. Additionally, the deformation due to expansion of the filter plates which occurs when a pulsed jet of air is blown into the gas channels in the filter element for dislodging dust buildup is sufficiently reduced to enhance the durability of the filter element to repeated dislodging operations.

If the reinforcements are similar in cross-sectional shape to the filter plates, if they have such dimensions that they can inscribe the ridges and grooves of the filter plates, and if they are provided inside of the filter element in such a way that they are opposed to each other, inward deformation (cave-in) of the corrugated cross section of the filter plates under the negative pressure which aspirates the gas to be filtered is sufficiently reduced by the reinforcements so that the negative pressure and, hence, the amount of aspiration, can be increased to permit the treatment of a larger volume of dust-containing gas.

Greater reinforcing effects can be achieved by combining these two types of reinforcements in appropriate ways.

Additionally, if each of the filter plates is shaped into a form that consists of repeating corrugated cross sections each comprising a top covering the vertex of the ridge of the reinforcement member, slopes that are continuous to the top and that extend along the slopes of the reinforcement, a first bottom that connects the slopes in selected positions, and a second bottom that extends to the groove of the reinforcement, the filter plates per se are reinforced to provide an even stronger filter element.

As mentioned above, a corrugated article which constitutes the filter plate is generally made from fibers of polymeric materials such as polyimides, polyphenylene sulfides, polyesters, polypropylenes, polyamide and polyethylene. A nonwoven fabric or felt of such fibers can be formed into a desired shape, i.e. the desired corrugated shape, by being subjected to a span-bond process in which fibers therein are bonded together with the application of adhesive onto the fabric, mixing of synthetic fibers having a low melting point into the fabric, dispersion of low melting point synthetic resin particles onto the fabric or the like. In case the corrugated article is made from polyimide fibers of a specific type, the gas-permeable corrugated articles can be manufactured in an efficient manner by making use of the property of the polyimide. That is, by heating a nonwoven fabric or felt of highly heat-resistant aromatic polyimide fibers for an appropriate time at temperatures higher than the glass transition point of the polyimide, the polyimide fibers will shrink as they soften, and this accelerates the tendency of the fibers to be dense together, thereby forming the gas-permeable corrugated articles having porous and self-supporting properties capable of being used as the filter plates.

Described below is a specific example of a corrugator using caterpillar molds that are suitable for performing the successive steps of preheating, molding and cooling to produce a corrugated article from polyimide fibers. It should, however, be noted that the invention is by no means limited to this specific example. It should also be noted that the steps of preheating, molding and cooling may be performed on fluted rolls in place of the caterpillar molds.

The corrugator to be used in the invention will now be described with reference to FIGS. 15 and 16, which are a side view and a plan view, respectively, of the corrugator.

The corrugator shown in FIGS. 15 and 16 comprises a preheating zone 103 which is supplied with a felt 102 as it is unwound from a reel 101 in a feed zone, as well as a thermal molding zone 104, a cooling zone 105 and a cutter 109 on which the cooled shape is cut to a desired size. The following description is based on FIG. 15, which is a side view of the corrugator using caterpillar molds.

Figure 20:
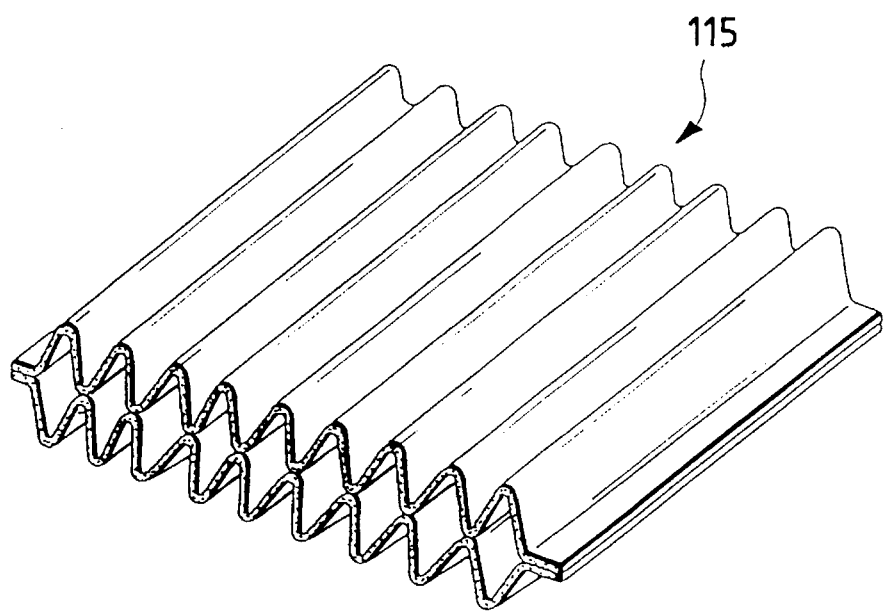
FIG. 20 is a perspective view of box-shaped filter element having corrugated surfaces as fabricated by joining two members of the shaped article shown in FIG. 19 according to the invention.

As shown in FIG. 15, the preheating zone 103 is furnished with a pair of opposed preheating caterpillar molds 106, the thermal molding zone 104 is furnished with a pair of opposed thermal molding caterpillar molds 107, and the cooling zone 105 is furnished with a pair of opposed cooling caterpillar molds 108. Felt 102 unwound from the reel 101 in the feed zone is preheated by being delivered to pass between the preheating caterpillar molds 106 in the preheating zone 103. The preheated felt 102 is then delivered to pass between the thermal molding caterpillar molds 107 in the thermal molding zone 104 so that it is thermally molded to be given corrugated surfaces; subsequently, the corrugated Two of such cut sheets of the shaped article were bonded together to fabricate a self-supporting, box-shaped filter element (identified by 115 in FIG. 20) that had corrugated surfaces; the filter element was 50 mm high, 1,000 mm wide and 1,500 mm long.

The polyimide used in Example 7 had the following chemical formula:

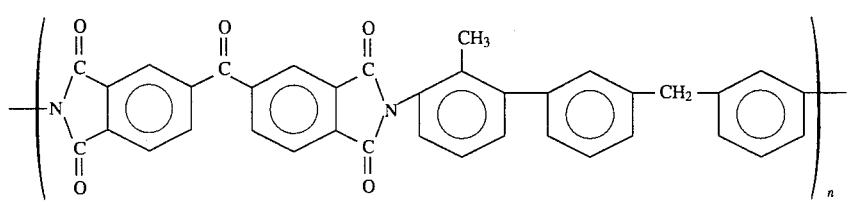

felt is delivered to pass between the cooling caterpillar molds 108 in the cooling zone 105 so that it is cooled to set. Finally, the cooled felt is cut to a desired size on the cutter 109. Shown by 110 is the cut sheet of the desired shape with corrugated surfaces.

Figure 17:
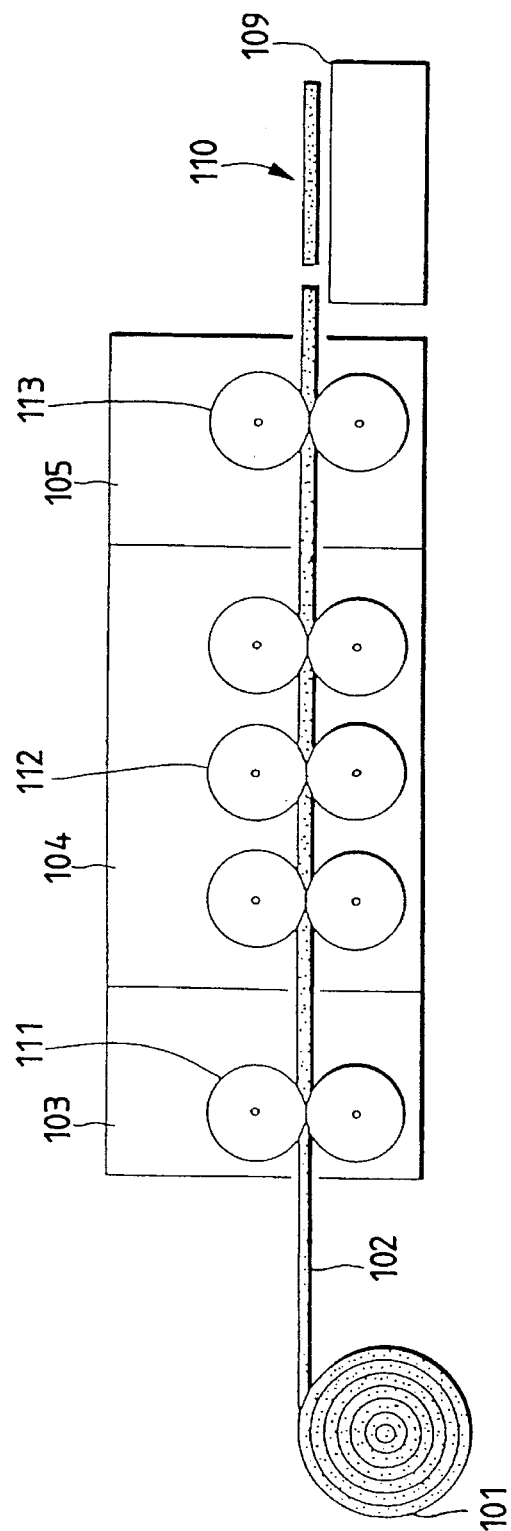
FIG. 17 is a side view of a corrugator that may be used to implement the process of the invention using grooved rolls.
Figure 18:
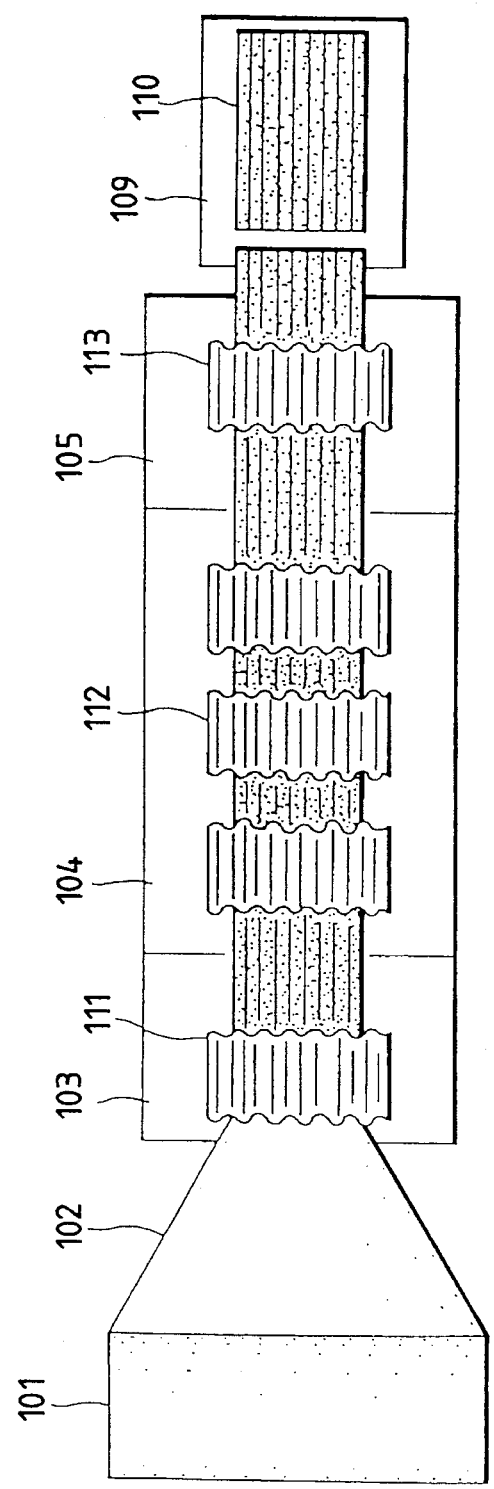
FIG. 18 is a plan view of the corrugator shown in FIG. 17.

FIGS. 17 and 18 are a side view and a plan view, respectively, of a modified version of the corrugator to be used in the invention, in which the steps of preheating, molding and cooling are performed on grooved rolls. As shown, the preheating zone 103 is furnished with a pair of opposed preheating grooved rolls 111, the thermal molding zone 104 is furnished with a pair of opposed thermal molding grooved rolls 112, and the cooling zone 105 is furnished with a pair of cooling grooved rolls 113. As in the case of the corrugator using caterpillar molds, felt 102 is unwound from reel 101 in the feed zone to pass through successive stages of preheating, thermal molding and cooling so that it is given corrugated surfaces; thereafter, the shaped felt emerges to the cutter 109, where it is cut to a desired size 110.

Example 7 was formed in the following manner.

Polyimide fibers having a draw ratio of 1:5 and a thickness of 30 μm were produced from benzophenone-3,3', 4,4'-tetracarboxylic dianhydride and 4,4'-methylene-bis-(tolylene isocyanate). The fibers were preshaped by needle punching to prepare a sample of needled felt 102 having an areal density of 475 g/m², a thickness of 2.5 mm and a width of 1,630 mm.

The thus prepared felt 102 was wound on a reel 101 and processed in the following manner with a corrugator using caterpillar molds as shown in FIG. 15 to produce a gas-permeable shaped article from polyimide fibers that had corrugated surfaces.

Figure 19:
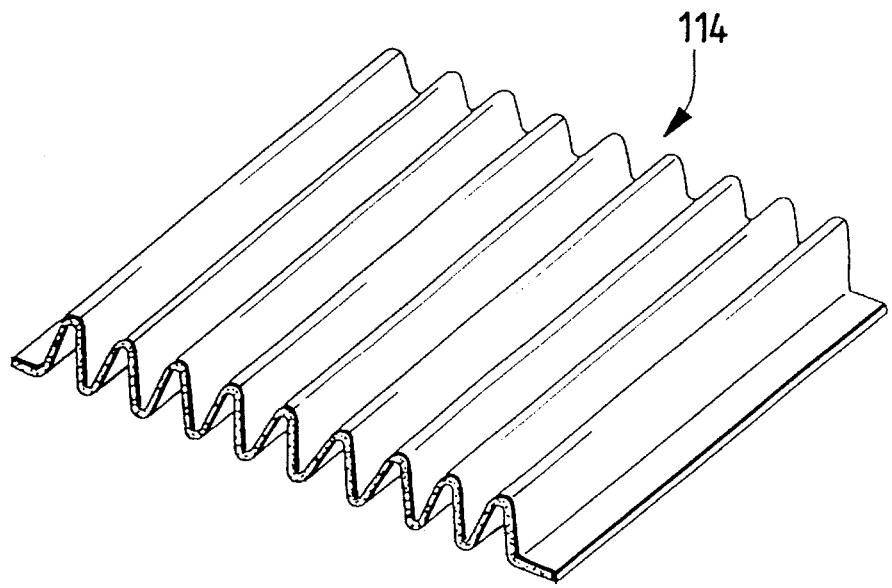
FIG. 19 is a perspective view of a shaped article made from polyimide fibers that has a corrugated surface according to the invention.

The felt 102 unwound from the reel 101 was supplied into preheating zone 103 at 300° C. and preheated on preheating caterpillar molds 106. The preheated felt 102 was transferred into thermal molding zone 104 held at 340° C., in which corrugations 25 mm high (for their cross section, see FIG. 19) were formed by the thermal molding caterpillar molds 107 in a direction perpendicular to the travel of the felt 102. Subsequently, the felt was supplied into the cooling zone 105, where it was cooled to 70° C. on the cooling caterpillar molds 108. Thereafter, the cooled felt was delivered to the cutter 109 and cut to a length of 1,000 mm, thereby producing a gas-permeable shaped article of polyimide fibers (identified by 114 in FIG. 19) that had corrugated surfaces.

Example 8 was formed in the following manner.

A sample of needled felt 102 was prepared as a preform by needle punching as in Example 7. The thus prepared felt 102 was wound on a reel 101 and processed in the following manner with a corrugator using grooved rolls as shown in FIG. 17 to produce a gas-permeable shaped article from polyimide fibers that had corrugated surfaces.

Figure 21:
FIG. 21 is a perspective view of a shaped article made from polyimide fibers that has a corrugated surface and which is self-supporting according to the invention.

The felt 102 unwound from the reel 101 was supplied into preheating zone 103 at ca. 300° C. and preheated on preheating fluted rolls 111. The preheated felt 102 was transferred into thermal molding zone 104 held at 340° C., in which corrugations (every third corrugation was 5 mm higher than the preceding two, as shown in section in FIG. 21) were formed by the thermal molding grooved rolls 112 in a direction parallel to the travel of the felt 102. Subsequently, the felt was supplied into the cooling zone 105, where it was cooled to 70° C. on the cooling grooved rolls 113. Thereafter, the cooled felt was delivered to the cutter 109 and cut to a length of 1,500 mm, thereby producing a gas-permeable shaped article of polyimide fibers (identified by 116 in FIG. 21) that had corrugated surfaces.

Figure 22:
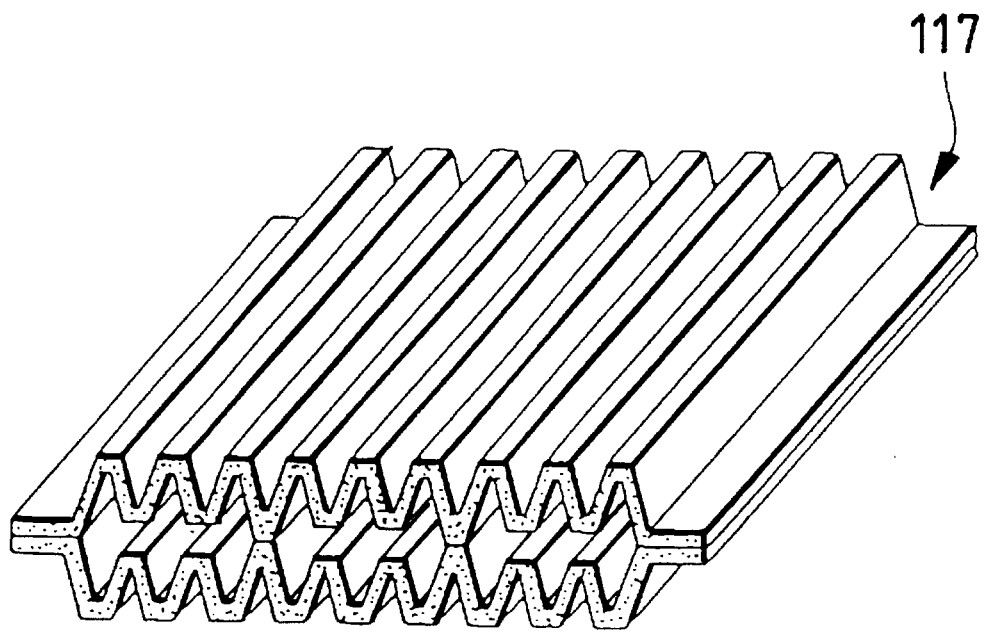
FIG. 22 is a perspective view of box-shaped filter element having a cell structure that permits backwashing according to the invention.

Two of such cut sheets of the shaped article were bonded together to fabricate a self-supporting, box-shaped filter element (identified by 117 in FIG. 22) that had corrugated surfaces and a cell structure permitting efficient backwashing; the filter element was 60 mm high, 1,000 mm wide and 1,500 mm long.

Example 9 was formed in the following manner.

A sample of needled felt 102 was prepared as a preform by needle punching as in Example 7, except that the width of the needle felt 102 which was 1,630 mm in Example 7 was changed to 800 mm.

Figure 23:
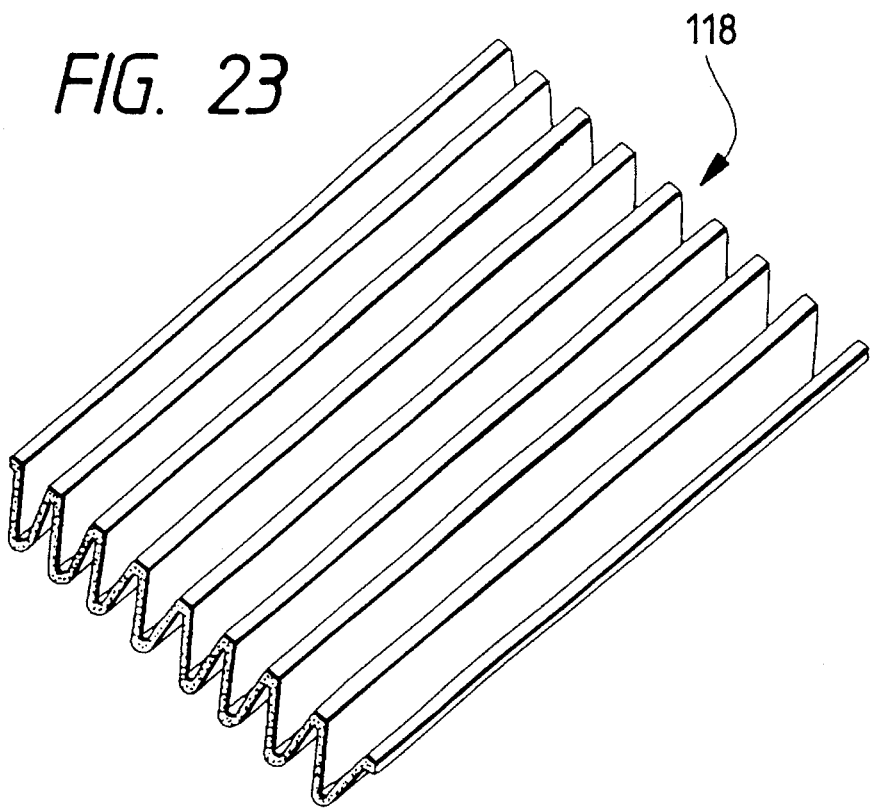
FIG. 23 is a perspective view of a long, self-supporting, shaped article made from polyimide fibers according to the invention.

The thus prepared felt 102 was wound on a reel 101 and processed with a corrugator using grooved rolls as shown in FIG. 17 by the same procedure as used in Example 8 to produce a gas-permeable shaped article from polyimide fibers that had corrugated surfaces with a corrugation height of 40 mm. The shaped article as obtained by cutting on the cutter 109 was very long (10 m) as shown in FIG. 23, in which it is indicated by 118.

Figure 24:
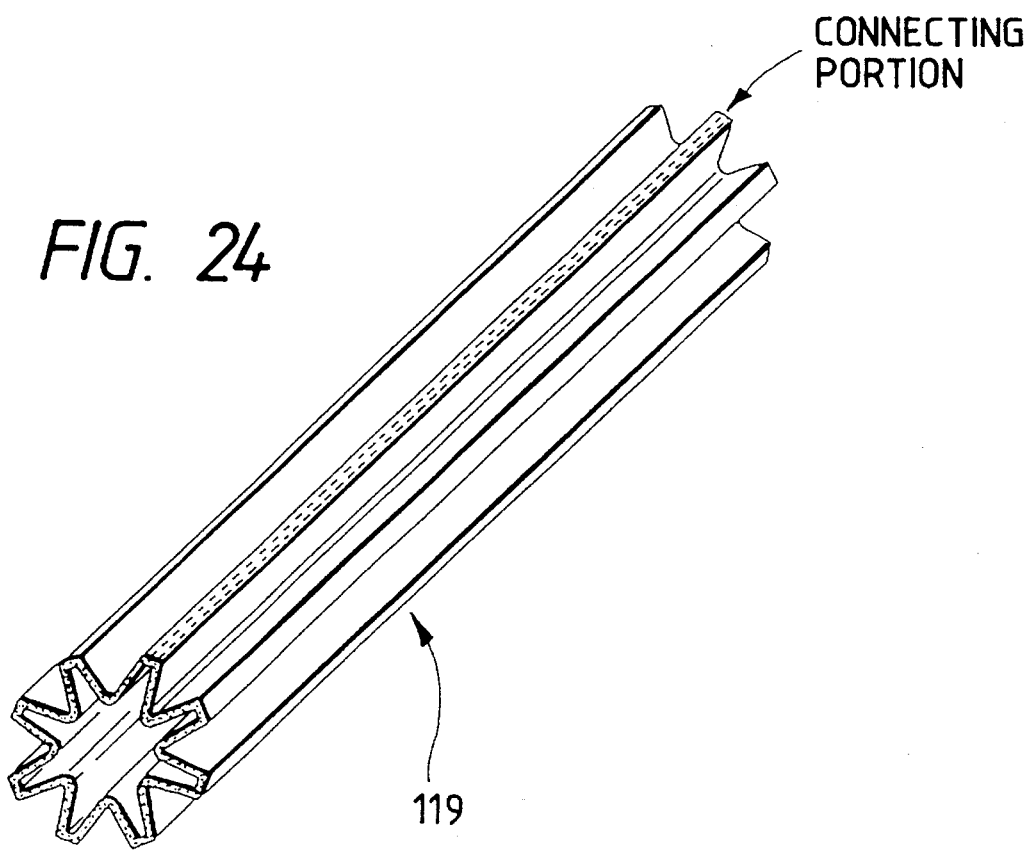
FIG. 24 is a perspective view of a long tubular filter element according to the invention.

This shaped article was joined along two lateral sides to fabricate a tubular filter element (indicated by 119 in FIG. 24) that had 108 corrugations and which were 115 mm in diameter and 10 m long.

The process of the invention is capable of producing a shaped article from polyimide fibers that is highly heat-resistant, that has gas permeability through various mesh sizes, that has smooth surfaces on which particles will not easily adhere and from which any deposited particles can be easily dislodged and that, hence, has low likelihood of clogging to assure prolonged service life. According to the invention, a nonwoven fabric or felt made of flame-retardant and highly heat-resistant aromatic polyimide fibers is corrugated by transversal or longitudinal passage through successive stages of preheating, molding and cooling using a tandem arrangement of caterpillar molds or grooved rolls, and a pair of such corrugated nonwoven fabrics or felts are joined together to fabricate a filter element with corrugated surfaces that is rigid enough to be self-supporting.

If desired, the felt may be corrugated in the longitudinal direction and joined along two lateral sides to fabricate a long tubular filter element with corrugated surfaces that is rigid enough to be self-supporting.

If the molding is performed in such a way that the transversal or longitudinal corrugations vary in height at given intervals, one can produce a gas-permeable shaped article of polyimide fibers having a cell structure that permits efficient backwashing.

If the reinforcements are provided inside the filter element, the reinforcements are interposed between the two cut sheets of the shaped article before they are bonded together.

A further example of the reinforced filter element will be described below.

Figure 25:
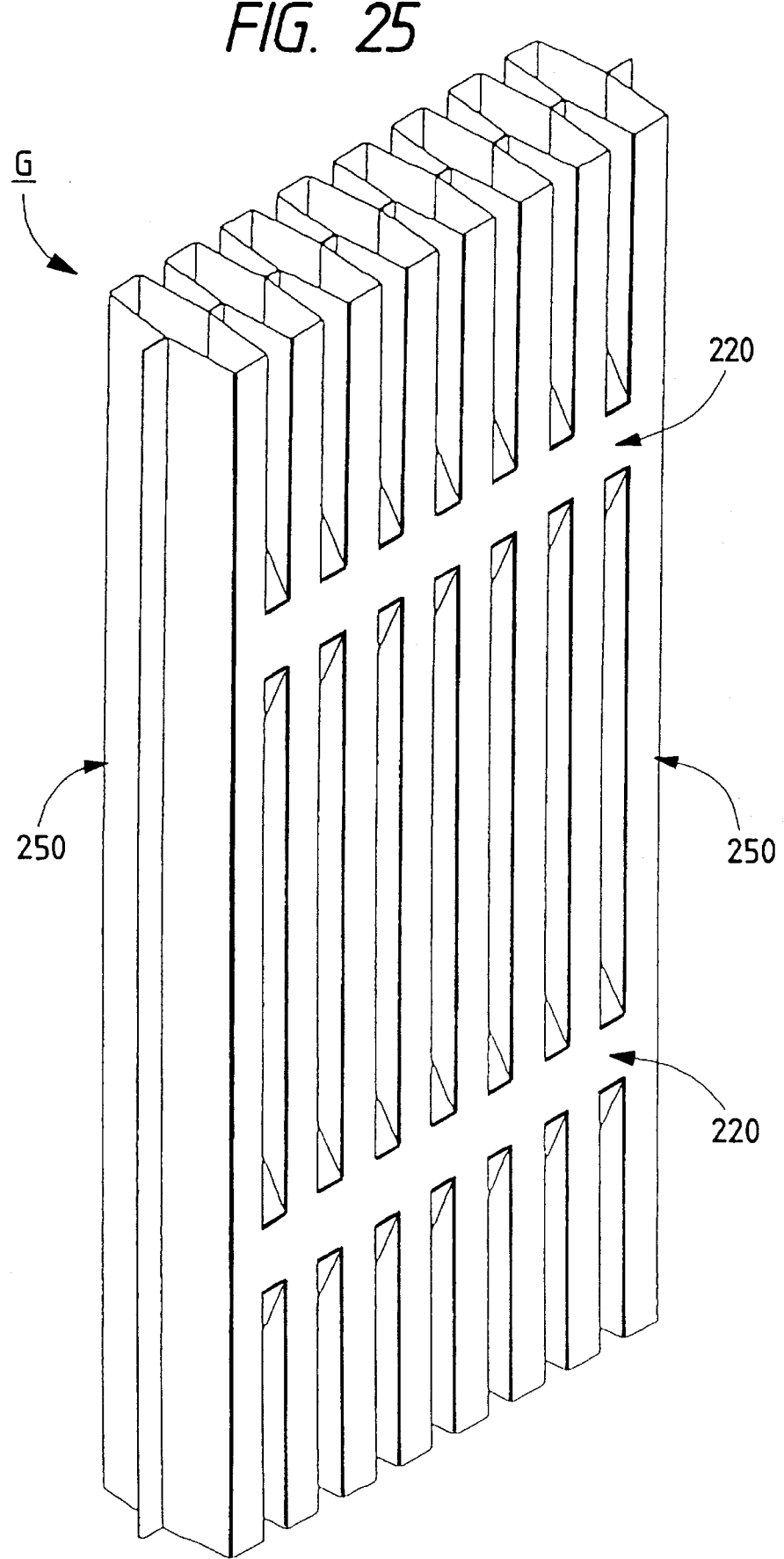
FIG. 25 is a perspective view of a filter element of the invention.
Figure 26:
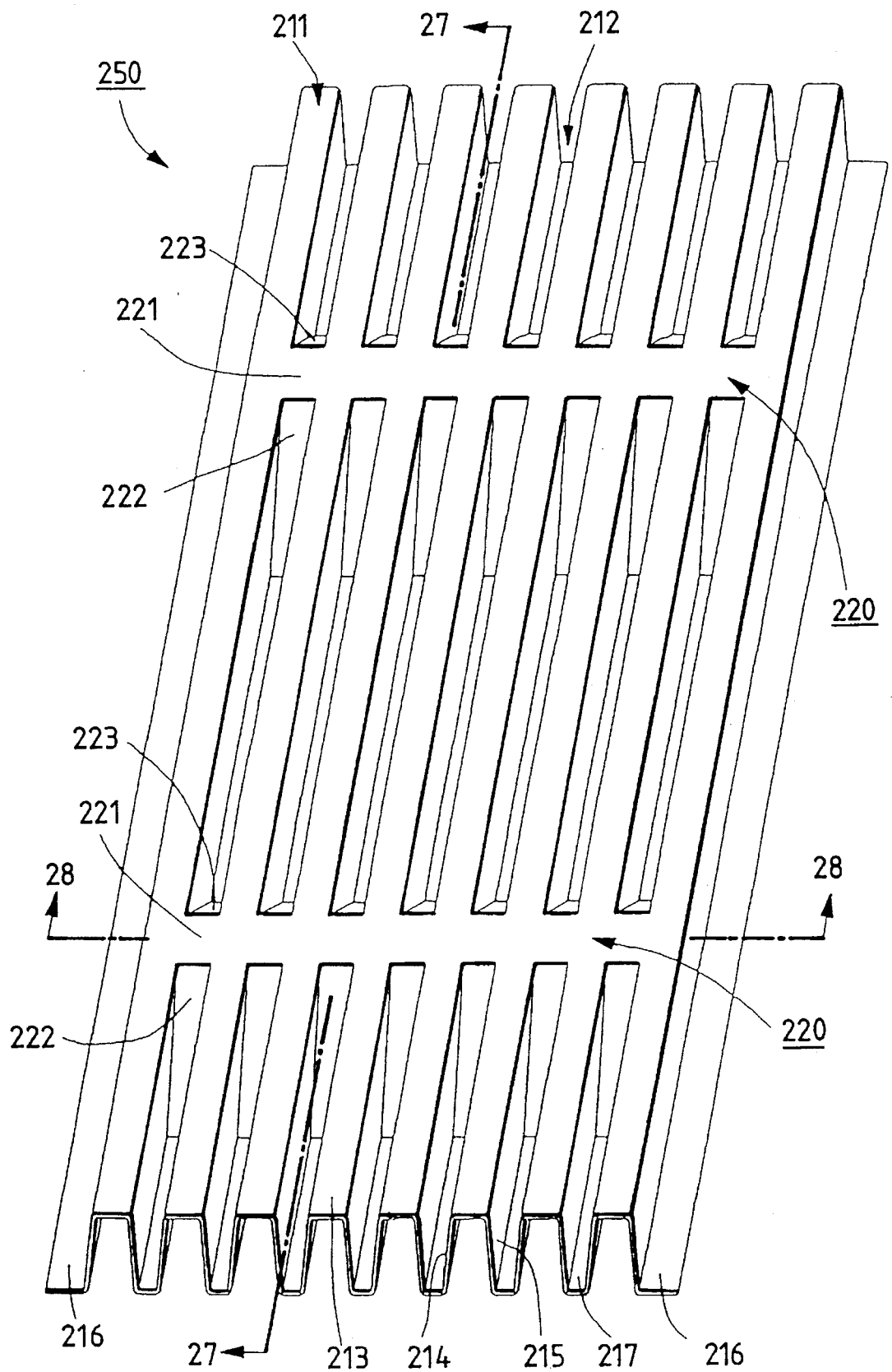
FIG. 26 is a perspective view of a filter that is part of the filter element shown in FIG. 25.
Figure 27:
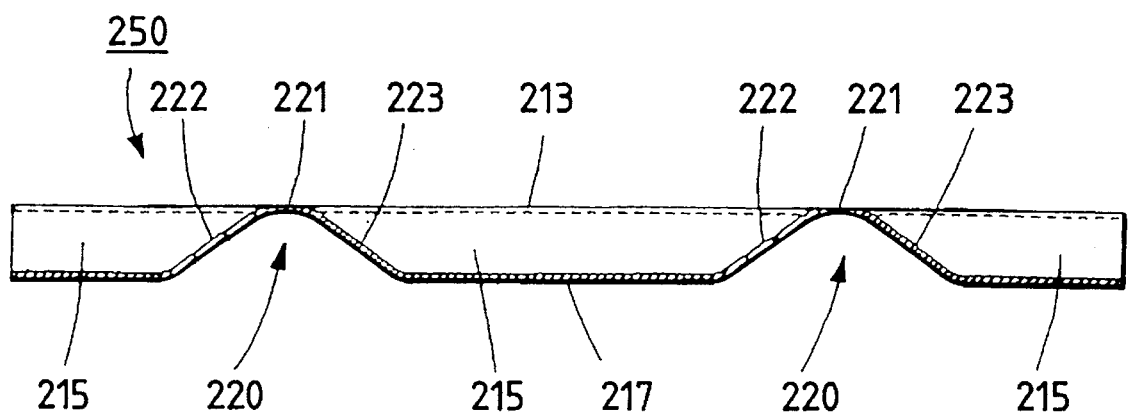
FIG. 27 is section 27—27 of FIG. 26.
Figure 28:
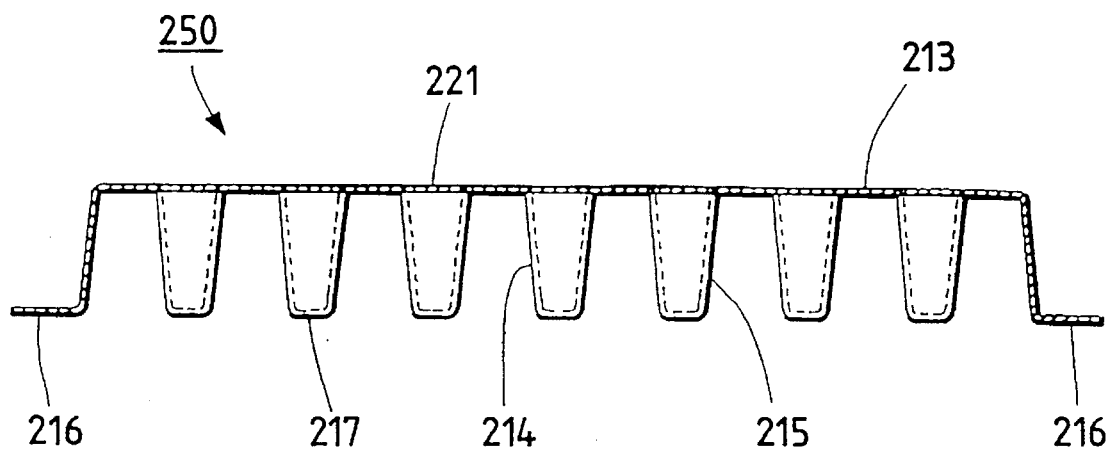
FIG. 28 is section 28—28 of FIG. 26.
Figure 29:
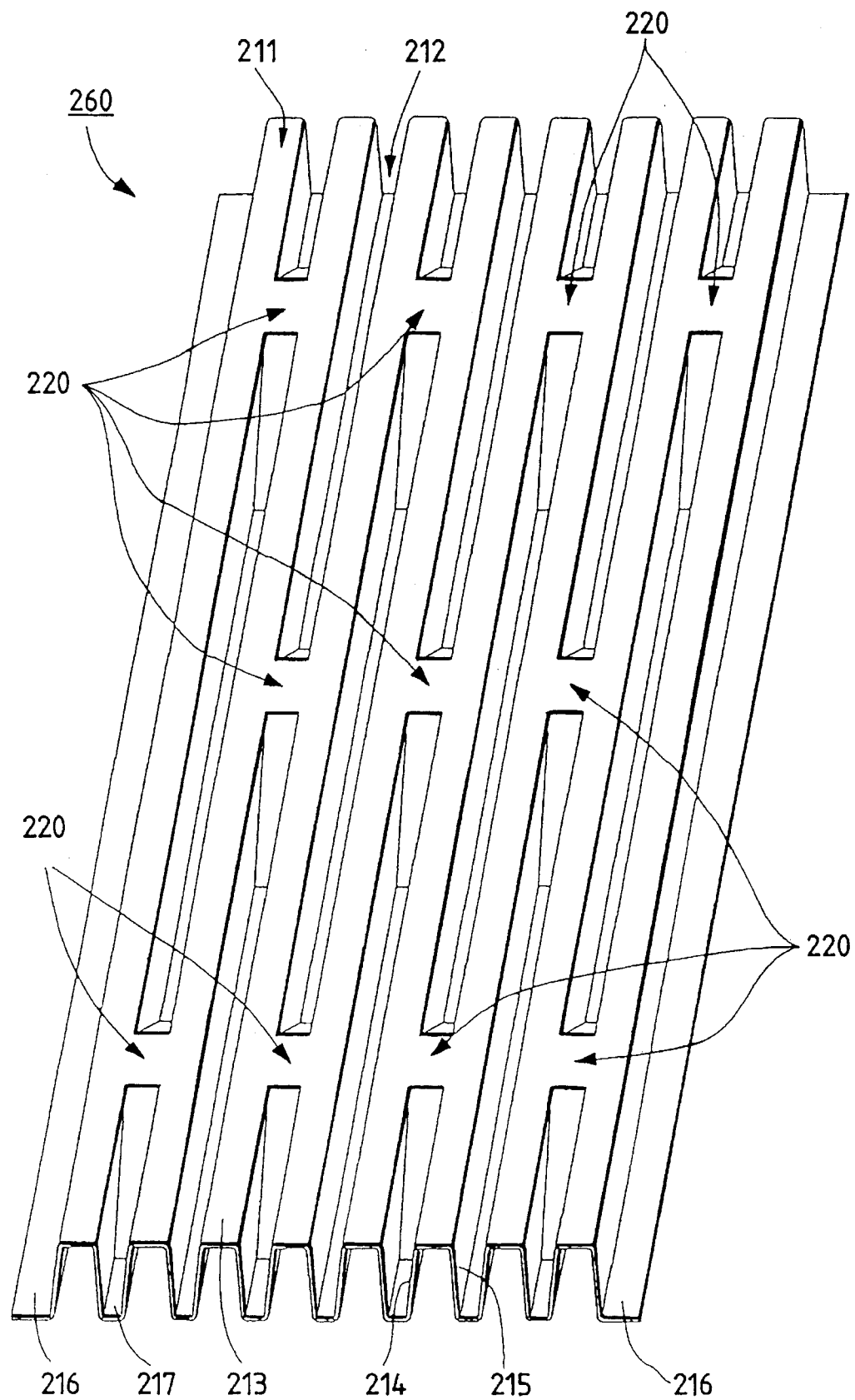
FIG. 29 is a perspective view of a modified version of a filter plate which is part of a filter element of the invention.

FIG. 25 is a perspective view of the filter element of the invention; FIG. 26 is a perspective view of a filter plate that is part of the filter element shown in FIG. 25; FIG. 27 is section 27—27 of FIG. 26; FIG. 28 is section 28—28 of FIG. 26; and FIG. 29 is a perspective view of a modified version of the filter plate which is part of the filter element of the invention.

The filter element of the invention which is generally indicated by G in FIG. 25 is the combination of a pair of filter plates 250 in each of which adjacent ridges in the corrugated cross section are interconnected by a plurality of connectors 220.

As shown in FIG. 26, each of the filter plates 250 has adjacent ridges 211 interconnected by a plurality of connectors 220. Each of the filter plates 250 also has grooves 212 and a pair of flanges 216. To produce the filter plates 250, fibers of polymeric materials such as polyimides, polyphenylene sulfides, polyesters and polypropylenes are carded and needle punched to form a nonwoven fabric having a predetermined fiber density, which is then thermally cured as compressed in a press having a corrugated surface profile capable of forming connectors 220. Since the filter element G needs heat resistance, the polymeric material to be used is preferably polyimide fibers. The process using the catapillar molds or grooved rolls is applicable in this case.

Since the connectors 220 are formed as an integral part of the corrugated cross section of the filter plates 250, each connector comprises a flat portion 221 that extends flush with the top 213 of the filter plate 250 and a pair of slopes 222 and 223 that slope down from opposite ends of the flat portion 221 toward the bottom 217 of the filter plate 250 (see FIGS. 27 and 28). The flat portion 221 may have a level difference from the top 213.

The connectors 220 are provided in a straight line across the width of the filter plate 250 in a direction perpendicular to the length of the ridges 211 in the filter plate 250. The straight line may have an angle other than 90° with respect to the length of the ridges 211 as long as the connectors 220 provide the desired reinforcing property. Connectors 220 provided in a straight line are spaced apart in the longitudinal direction of the filter plate 250. A further improvement in the strength of the filter plate 250 is achieved by providing the connectors 220 in areas that will be the antinodes of the flexural vibrations of the filter plates 250.

Thus, not only are the tops 213 of adjacent ridges 211 in the filter plate 250 interconnected by the flat portion 221 of the connector 220 but also the opposed slopes 214 and 215 in the corrugated cross section of the filter plate 250 are interconnected by the slopes 222 and 223 of the connector 220; therefore, the filter plate 250 is unable to bend at the corners the top 213 of the corrugated cross section forms with the slopes 214 and 215 or at the corners the bottom 217 forms with the slopes 214 and 215. In other words, the filter plate 250 is effectively reinforced so that its corrugated profile will not deform easily.

Thus, the filter element G has the corrugated portion of the filter plates 250 reinforced by the connectors 220, and even if the flexibility of the filter plates 250 increases as a result of the increase in their temperature due to the filtration of a hot dust-containing gas, the corrugated profile of the filter plates 250 will not readily deform.

Additionally, even when high-pressure air is blown into the gas channels in the filter element G for dislodging dust particles with the pulsed jet of air, the connectors 220 will reduce the deformation due to expansion of the filter plates 250, thereby preventing the deformation of their corrugated profile; hence, the durability of the filter element G to backwashing is effectively improved.

What is more, even if the negative pressure for aspirating the gas to be filtered is increased, the corrugated profile of the filter plates 250 reinforced by the connectors 220 will not easily deform and, hence, the filtering capability of the plates 250 is effectively improved.

In the case shown in FIGS. 25 to 28, the connectors 220 are provided in a straight line across the width of the filter plates 250, but this is not the sole case of the invention, and the connectors 220 may be staggered along the length of one ridge 211 in the corrugated cross section with those along the length of an adjacent ridge 211 as in the case of a filter plate 260 shown in FIG. 29.

Example 10 was formed in the following manner.

Polyimide felt having an areal density of 500 g/cm$^2$ and measuring 2.0 mm thick, 3,000 mm wide and 1,500 mm was set up and held in a mold at 320° C. for 30 min to form a filter plate 1,000 mm wide and 1,500 mm long that had a corrugated cross-sectional shape and which had the ridges connected as shown in FIG. 26. The ridges in the filter plate were 30 mm high and their vertices were spaced apart by a distance of 28 mm. Adjacent ridges were interconnected by connectors at intervals of 300 mm in the longitudinal direction of the filter plate. The connectors were 15 mm wide and each had slopes at opposite ends that were inclined downward at an angle of 30°.

A pair of such filter plates were combined together to fabricate a filter element as shown in FIG. 25. The filter element was then subjected to a filtration test under accelerated deterioration conditions in which the filtration temperature was set at 270° C., which was higher than the commnonly employed value, and in which the dislodging of dust particles with a pulsed jet of air was performed at 12-sec intervals, which were shorter than in the normal operation. The feed gas to be filtered contained 5 g/Nm$^3$ of Kanto Loam (Class 11 in JIS) as dust, and it was processed at a rate of 1 m/min. The amount of dust particles contained in the filtered gas was measured with a digital dust monitor of Shibata Scientific Technology, Ltd. operating on the integration of light scattering. When the measured dust concentration exceeded 0.05 mg/Nm$^3$, the filter element under test was considered to have failed. The time to failure was 118 h.

In another run, a hot gas (270° C.) containing 5 g/cm$^3$ of Kanto Loam (Class 11 in JIS) was filtered at an aspiration pressure of 0.05 kg/m$^2$ for 250 h, with the adhering dust particles being dislodged with a pulsed jet of air at a pressure of 3 kg/cm$^2$. After the filtration, the filter element was disassembled and the filter plates were examined, but their corrugated profile was not found to have experienced any deformation.

The same polyimide felt as used in Example 10 was set up and held in a mold at 320° C. for 30 min to form a filter plate 1,000 mm wide and 1,500 mm long that had the corrugated cross-sectional shape shown in FIG. 2. A pair of such filter plates were combined to fabricate a filter element as shown in FIG. 3. The ridges in each filter plate had the same inter-vertex distance and height as in Example 10.

The filter element was subjected to a filtration test under the same conditions as in Example 10; the time to failure was 64 h, the corrugated profile of the filter plates experienced torsions in the longitudinal direction, and the resulting nonuniformity in the distance between ridges evidenced considerable deformation of the filter plates.

Thus, the reinforcing effect of connecting the ridges in the filter element was demonstrated.

Thus, the filter element of the invention offers the following outstanding advantages.

Adjacent ridges in the corrugated cross section of each filter plate are interconnected with the connectors and, hence, the corrugated cross section of the filter plates will not easily bend at corners and can be effectively protected against deformation even if the flexibility of the filter plates increases upon filtration of a hot dust-containing gas.

The connectors which interconnect adjacent ridges in the corrugated cross section of each filter plate also serve to reinforce the filter plates per se and, hence, not only their durability to repeated application of a pulsed jet of air in dislodging operations is enhanced but also the negative pressure for aspirating the dust-containing gas can be sufficiently increased to improve the capacity for the treatment of the dust-containing gas.

While the invention has been described in detail and with reference to specific examples thereof, it will be apparent to one skilled in the art that various changes and modifications can be made therein without departing from the spirit and scope thereof.

What is claimed is:

1. A reinforced filter element comprising:

a pair of filter plates, each being made of a nonwoven fabric or felt of a polymeric material and shaped into a plate having a corrugated cross section having a plurality of alternating ridges and grooves, said filter plates being positioned in such a way that the grooves in one filter plate are opposed to those in the other filter plate, said filter plates each having a first and a second longitudinal end, and said filter plates each having two side end portions; and at least one rigid reinforcement having two end portions and provided in a direction perpendicular to the length of said ridges and said grooves for reinforcing said pair of said filter plates, with both end portions of said at least one reinforcement being respectively secured to both side end portions of said pair of filter plates, and said at least one reinforcement being spaced from said first and said second longitudinal end.

2. A reinforced filter element according to claim 1 wherein said at least one reinforcement includes a pair of reinforcements which are similar in cross-sectional shape to said filter plates.

3. A reinforced filter element according to claim 2, wherein said pair of reinforcements have such dimensions that they can circumscribe the ridges and grooves of said filter plates, and wherein said pair of reinforcements are opposed to each other in such a way that said filter plates are held therebetween.

4. A reinforced filter element according to claim 2 wherein said pair of reinforcements have such dimensions that they can inscribe the ridges and grooves of said filter plates and wherein said pair of reinforcements are provided inside of said filter plates in such a way that they are opposed to each other.

5. A reinforced filter element according to claim 1 wherein said at least one reinforcement includes:

a pair of reinforcing members of a first type, that are similar in cross-sectional shape to said filter plates and which have such dimensions that they circumscribe the ridges and grooves of said filter plates; and a pair of reinforcing members of a second type, that are similar in cross-sectional shape to said filter plates and which have such dimensions that they inscribe the ridges and grooves of said filter plates; and wherein said pair of reinforcing members of said first type are provided opposed to each other outside of said filter plates so as to hold said filter plates therebetween; and said pair of reinforcing members of said second type are provided inside of said filter plates in such a way that they are opposed to each other.

6. A reinforced filter element according to claim 5 wherein said pair of reinforcing members of said first type are respectively confronted with said pair of reinforcing members of said second type through said filter plates.

7. A reinforced filter element according to claim 1 wherein said at least one reinforcement includes:

a pair of reinforcing members of a first type, that are similar in cross-sectional shape to said filter plates and which have such dimensions that they circumscribe the ridges and grooves of said filter plates; and a reinforcing member of a second type, that is a strip of flat plate;

wherein said pair of reinforcing members of said first type are opposed to each other in such a way that said filter plates are held therebetween; and said reinforcing member of said second type is provided inside of said filter plates in such a way that it is opposed to said pair of reinforcing members of said first type through said filter plates.

8. A reinforced filter element according to claim 1 wherein said at least one reinforcement includes:

a pair of reinforcing members of a first type that are similar in cross-sectional shape to said filter plates and which have such dimensions that they inscribe said ridges and grooves of said filter plates; and a pair of reinforcing members of a second type, each of said reinforcing members of said second type having a U-shaped cross section and being made up of a bottom plate and a pair of flanges erected at opposite ends of said bottom plate;

wherein said pair of reinforcing members of said first type are provided inside of said filter plates in such a way that they are opposed to each other, and said pair of reinforcing members of said second type are provided in such a way that the bottoms thereof are opposed to said filter plates and each flange of one reinforcing member of said second type is connected to a corresponding flange of the other reinforcing member of said second type by a connecting member.

9. A reinforced filter element according to claim 1, wherein a plurality of through-holes are formed in said at least one reinforcement.

10. A reinforced filter element comprising:

a pair of reinforcements each having a corrugated cross section made up of a plurality of alternating ridges and grooves, said reinforcements being positioned in such a way that the grooves in one reinforcement are opposed to those in the other reinforcement and that two end portions are formed;

a pair of filter plates having two end portions, with each filter plate being made of a nonwoven fabric or felt of a polymeric material and shaped into a form that is made up of repeating corrugated cross sections each including:

tops covering vertexes of ridges of said reinforcement;
slopes that are continuous to said tops and that extend along slopes of said reinforcement;
at least one first bottom that connects adjacent slopes of said filter plate in a position away from a corresponding groove of said reinforcement; and
at least one second bottom that extends closer to a corresponding groove of said reinforcement than does said at least one first bottom; and connecting members that connect said filter plates and said reinforcements at both end portions thereof.

11. A reinforced filter element according to claim 10, wherein said tops and slopes of said filter elements are contacted with said reinforcements.

12. A reinforced filter element according to claim 10, wherein said first bottom has the same width as that of said second bottom.

13. A reinforced filter element according to claim 10, wherein said filter elements circumscribe said reinforcements.

14. A reinforced filter element according to claim 10, wherein a plurality of through-holes are formed in said reinforcements.

15. A reinforced filter element comprising:

a pair of filter plates each being made of nonwoven fabric or felt of a polymeric material and shaped into a plate having a corrugated cross section having a plurality of ridges and grooves, said filter plates being positioned in such a way that the grooves in one filter plate are opposed to those in the other filter plate, each of said filter plates being provided with integral connectors that interconnect adjacent ridges, each of said filter plates having a first and a second longitudinal end, and each of said integral connectors being spaced from said first and said second longitudinal end.

16. A reinforced filter element according to claim 15, wherein said connectors are flush with the ridges of said filter plates.

17. A reinforced filter element according to claim 15, wherein said connectors are aligned in a line perpendicular to a direction in which said grooves extend.

18. A reinforced filter element according to claim 15, wherein said connectors are aligned in two lines each perpendicular to a direction in which said grooves extend.

19. A reinforced filter element comprising:

a gas-permeable filter element made from polymeric material and formed into a hollow, corrugated configuration to define a plurality of gas channels therein, each of said gas channels being elongated in a longitudinal direction, said filter element having a first and a second longitudinal end; and at least one reinforcement for reinforcing said filter element to maintain geometry of said corrugated configuration, said at least one reinforcement being arranged laterally with respect to said longitudinal direction, and said at least one reinforcement being spaced from said first and said second longitudinal end.

20. A reinforced filter element according to claim 19, wherein said at least one reinforcement includes a separate member which is connected to a flange of said filter element by means of bolt and nut.

21. A reinforced filter element according to claim 19, wherein said at least one reinforcement includes an integral member made from polymeric material and molded integrally and simultaneously when said filter element is molded.

22. A reinforced filter element according to claim 19, wherein said at least one reinforcement is gas-permeable.

23. A reinforced filter element according to claim 19, wherein said at least one reinforcement is disposed outside said filter element, and is contactable with an outer surface of said filter element to prevent excessive expansion of said filter element.

24. A reinforced filter element according to claim 19, wherein said at least one reinforcement is disposed outside said filter element, and supports flanges of said filter element to prevent lateral deformation of said filter element.

25. A reinforced filter element according to claim 19, wherein said at least one reinforcement is disposed inside said filter element, and is contactable with an inner surface of said filter element to prevent excessive contraction of said filter element.

26. A reinforced filter element according to claim 19, wherein said at least one reinforcement is disposed inside of said filter element, and supports flanges of said filter element to prevent lateral deformation of said filter element.

27. A reinforced filter element according to claim 19, wherein said corrugated configuration is formed by alternating ridges and grooves, and wherein said at least one reinforcement has a clearance from said ridges.

28. A reinforced filter element according to claim 19, wherein said corrugated configuration is formed by alternating ridges and grooves, and wherein said at least one reinforcement contacts with said grooves.

29. A reinforced filter element according to claim 19, wherein said gas channels communicate with each other.

30. A reinforced filter element according to claim 19, wherein said gas channels are separate from each other.

31. A reinforced filter element according to claim 19, wherein said filter element has longitudinal terminuses at least one of which is connected to an aspiration source, and wherein said reinforcement is arranged apart from said longitudinal terminuses.

32. A reinforced filter element according to claim 19, wherein said at least one reinforcement is arranged in a direction perpendicular to said longitudinal direction.

\* \* \* \* \*